United States Patent
Ogikubo

(10) Patent No.: US 7,471,314 B2
(45) Date of Patent: Dec. 30, 2008

(54) TRANSMISSION DEVICE, TRANSMISSION METHOD, REPRODUCTION DEVICE, REPRODUCTION METHOD, PROGRAM, AND RECORDING MEDIUM

(75) Inventor: Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 566 days.

(21) Appl. No.: 10/501,306

(22) PCT Filed: Nov. 11, 2003

(86) PCT No.: PCT/JP03/14320

§ 371 (c)(1),
(2), (4) Date: Jul. 13, 2004

(87) PCT Pub. No.: WO2004/047441

PCT Pub. Date: Jun. 3, 2004

(65) Prior Publication Data

US 2005/0243190 A1    Nov. 3, 2005

(30) Foreign Application Priority Data

Nov. 15, 2002    (JP)    ............... 2002-332652

(51) Int. Cl.
*H04N 9/04*    (2006.01)
*H04N 5/225*    (2006.01)
(52) U.S. Cl. ............................... 348/207.99
(58) Field of Classification Search ............. 348/207.99
See application file for complete search history.

(56) References Cited

U.S. PATENT DOCUMENTS

2003/0007189 A1 *   1/2003   Kusaka et al. ............... 358/402
2003/0016750 A1 *   1/2003   Cok ....................... 375/240.16

FOREIGN PATENT DOCUMENTS

| EP | 0 739 139 | 10/1996 |
|----|-----------|---------|
| EP | 0 963 118 | 12/1999 |
| EP | 1 237 370 | 9/2002 |
| JP | 8-251192 | 9/1996 |
| JP | 9-233467 | 9/1997 |
| JP | 10-285558 | 10/1998 |
| JP | 11-41575 | 2/1999 |
| JP | 2001 25013 | 1/2001 |
| JP | 2001-128171 | 5/2001 |
| JP | 2001-211450 | 8/2001 |
| JP | 2001-292381 | 10/2001 |
| JP | 2002-10204 | 1/2002 |
| JP | 2002-77797 | 3/2002 |
| JP | 2002 251870 | 9/2002 |
| JP | 2002-320203 | 10/2002 |
| JP | 2002 320212 | 10/2002 |
| JP | 2004 180288 | 6/2004 |

* cited by examiner

*Primary Examiner*—James M Hannett
(74) *Attorney, Agent, or Firm*—Frommer Lawrence & Haug LLP; William S. Frommer

(57) ABSTRACT

Transmit data composed by linking to main data representing an image and/or audio accessory information including frame rate information and frame identification information of each frame included in a reference frame period is generated and output. If the main data is reproduced using this transmit data, a variable reproduction speed range is set based on the frame rate information. In accordance with a specified reproduction speed within the variable reproduction speed range, thinning-out or repeating processing is performed on the data of image and/or audio utilizing the frame identification information, thereby making a reproduction speed of the main data variable easily to generate image signals or audio signals.

14 Claims, 21 Drawing Sheets

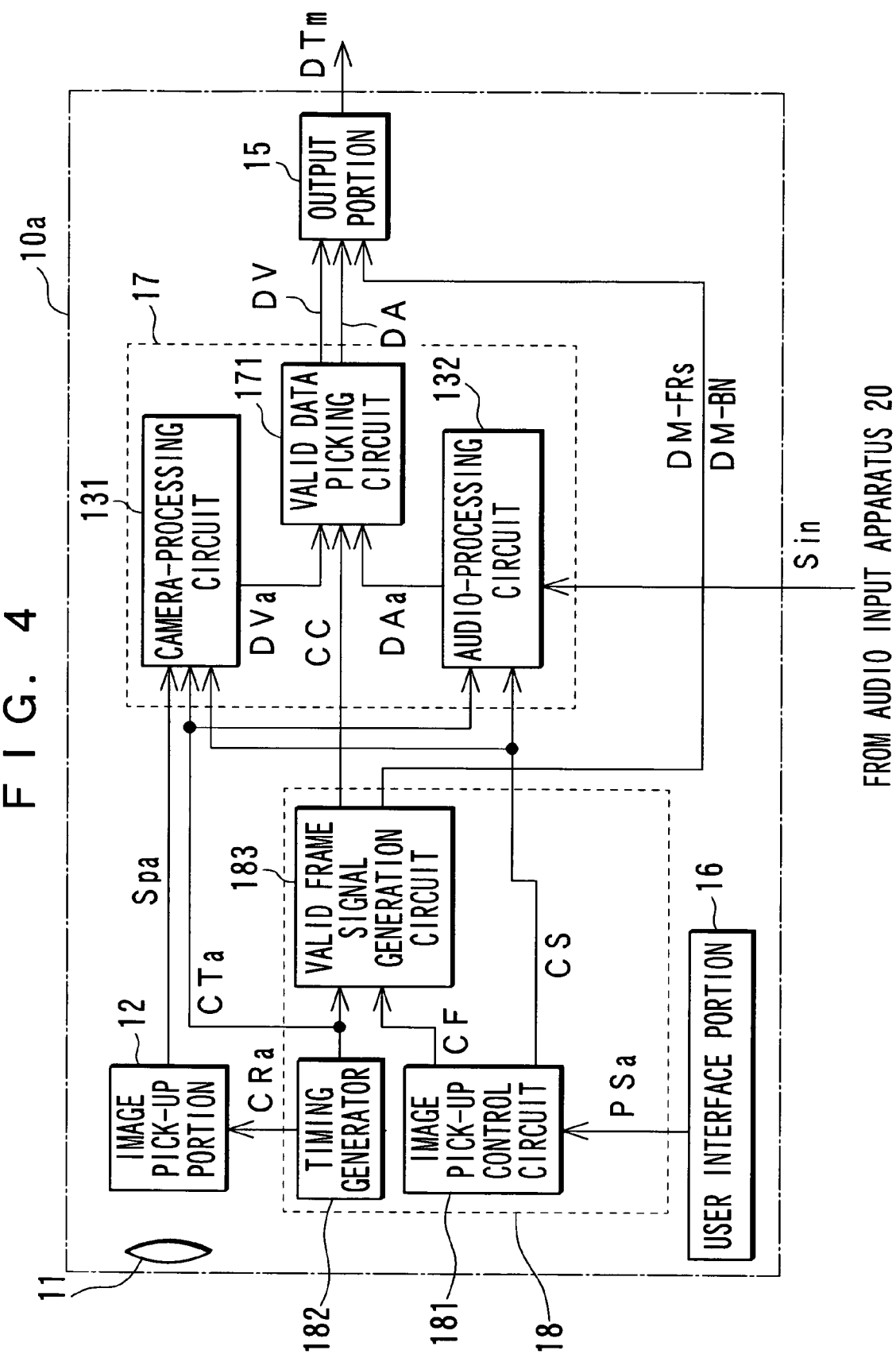

FIG. 5A (FRs)
FIG. 5B (DV) 
FIG. 5C (DM-FRs) 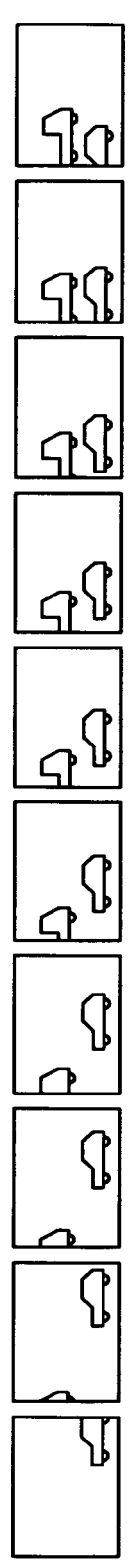
FIG. 5D (DM-BN) 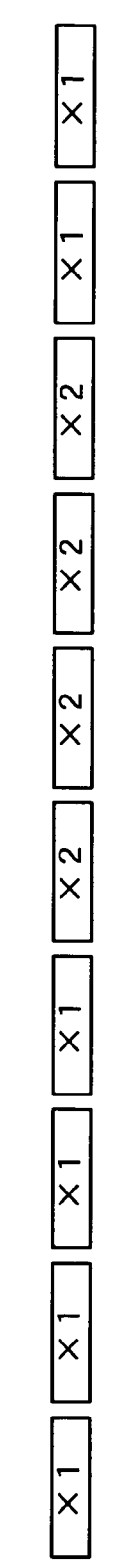
FIG. 5E (DV) 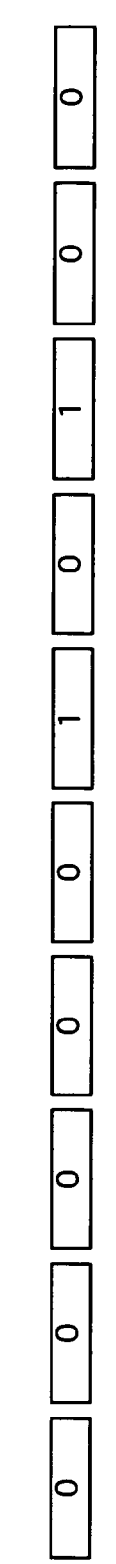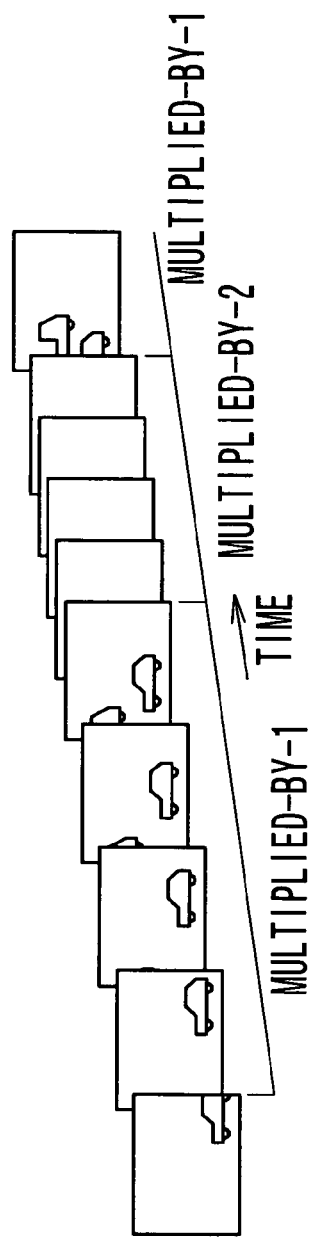

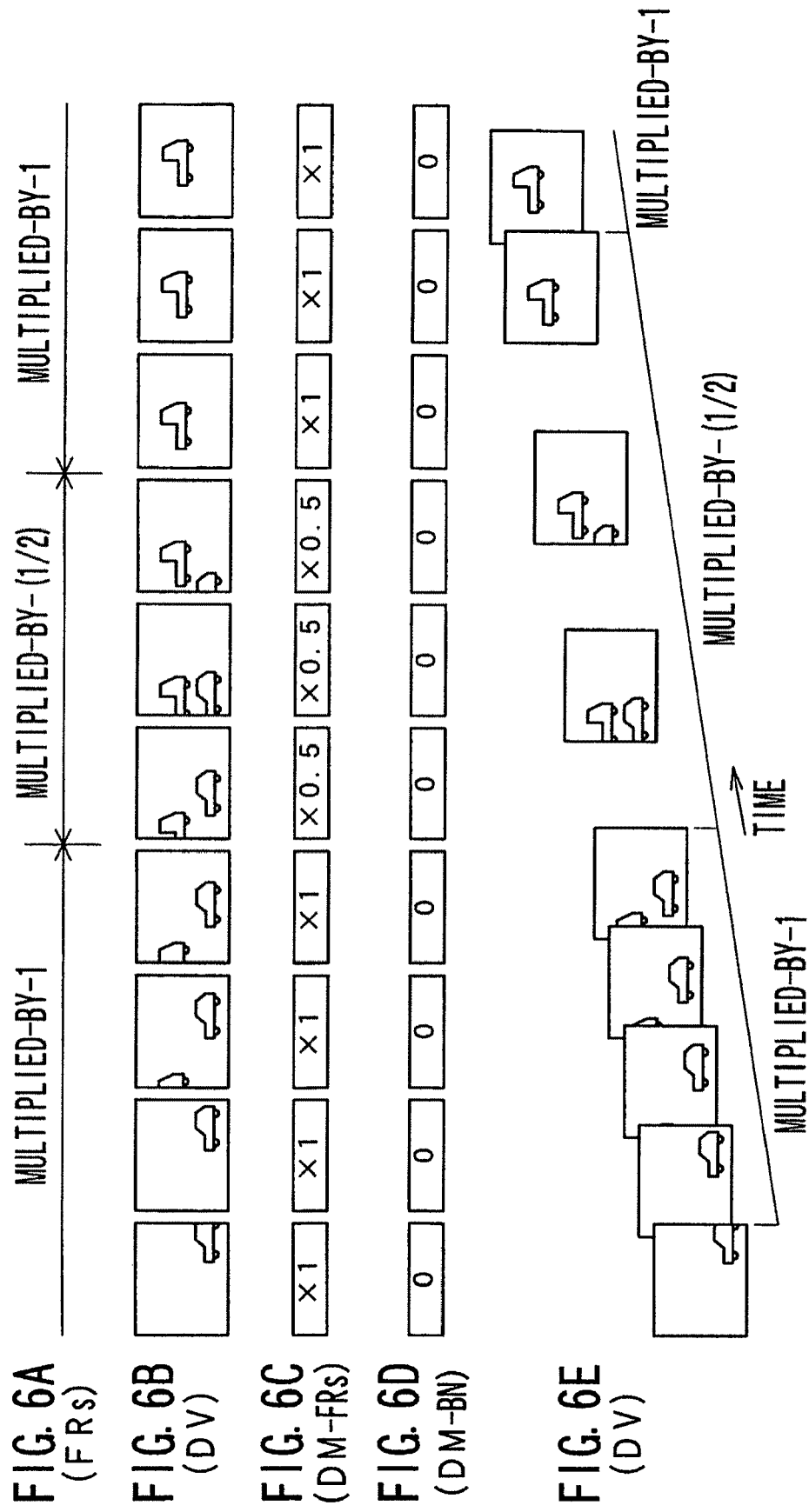

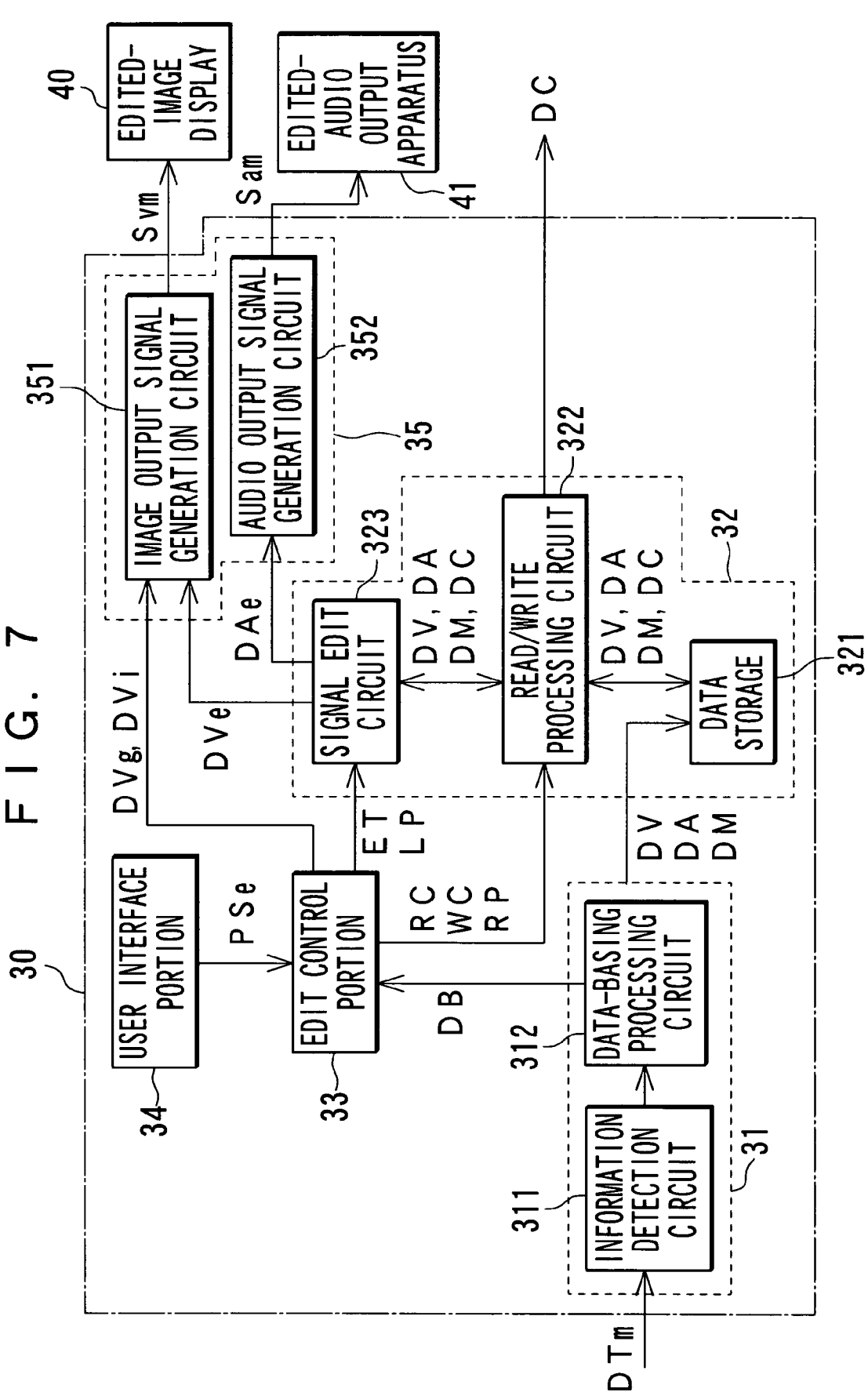

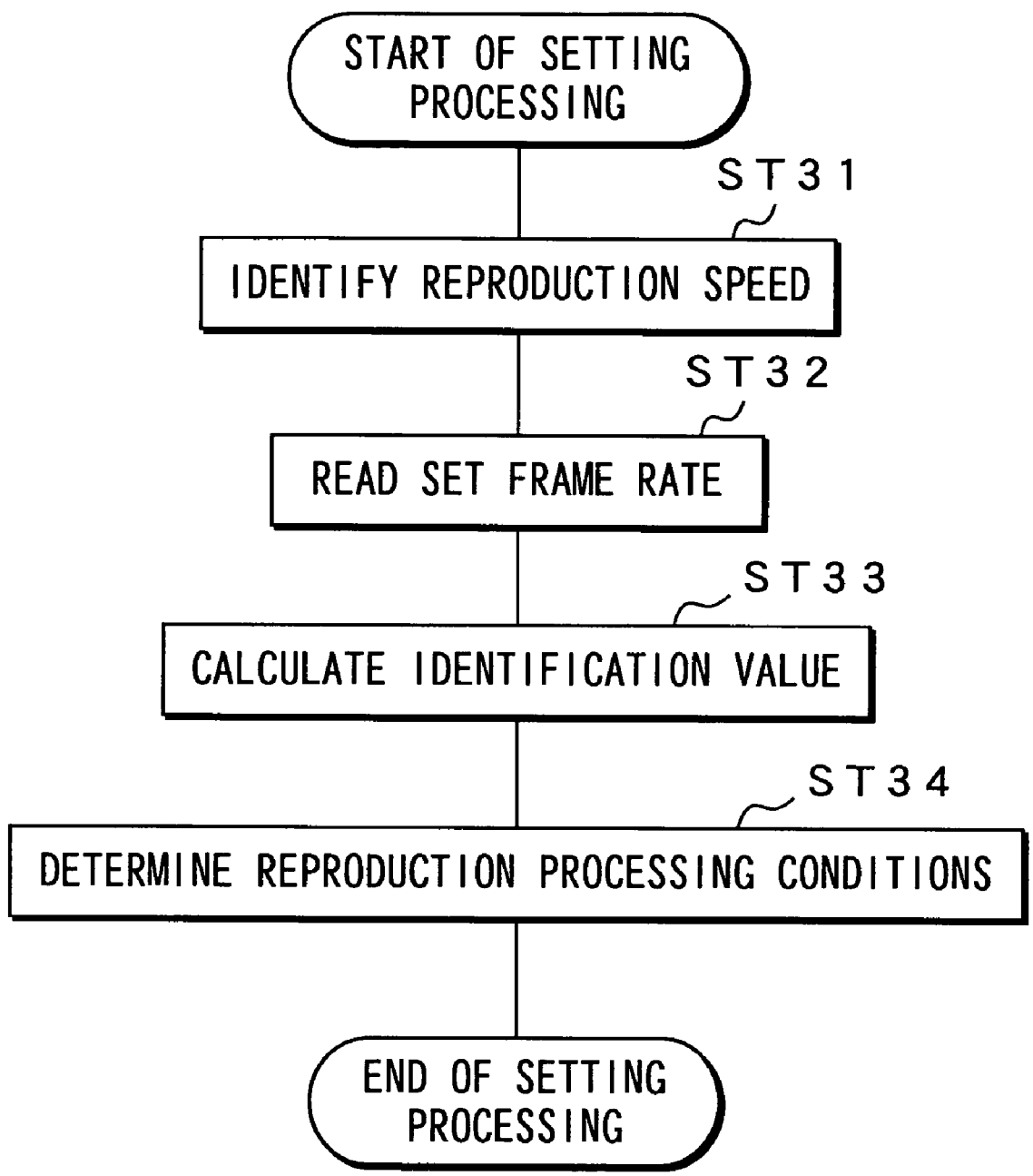

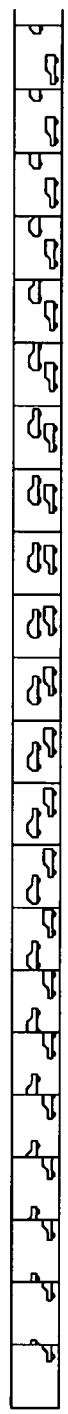
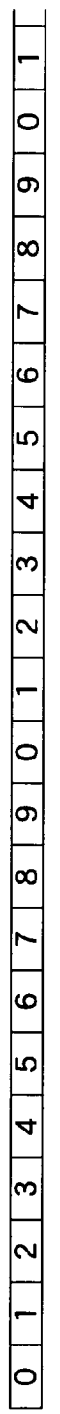
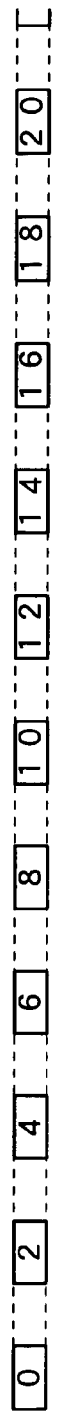
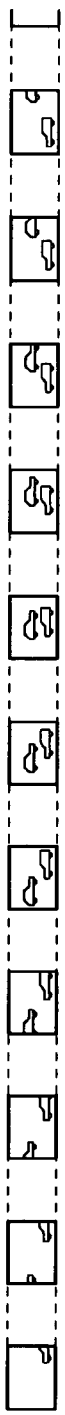
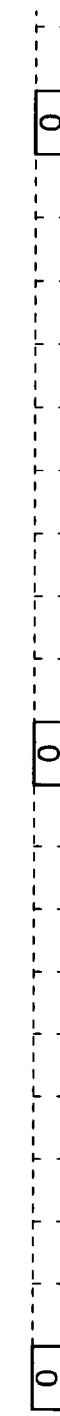
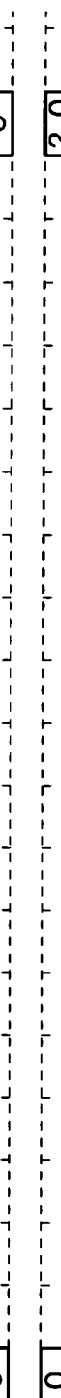
FIG. 16A (DVz)
FIG. 16B (DMz-FRs)
FIG. 16C (DMz-BN)
FIG. 16D (AN)
FIG. 16E (DMz-BN)
FIG. 16F (AN)
FIG. 16G (Svz)
FIG. 16H (DMz-BN)
FIG. 16I (AN)
FIG. 16J (Svz)
FIG. 16K (DMz-BN)
FIG. 16L (AN)
FIG. 16M (Svz)

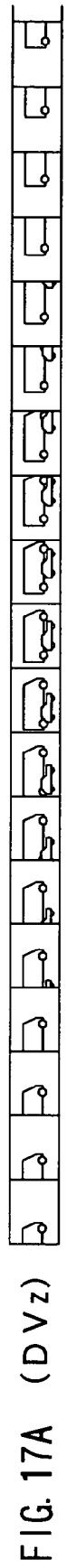
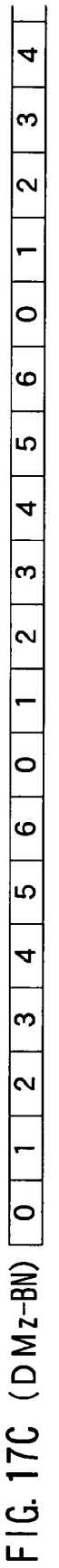
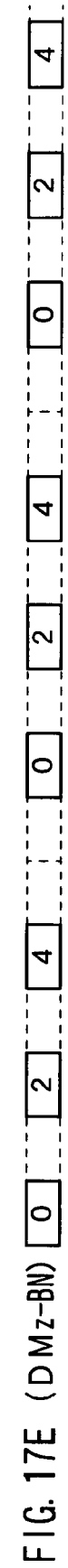
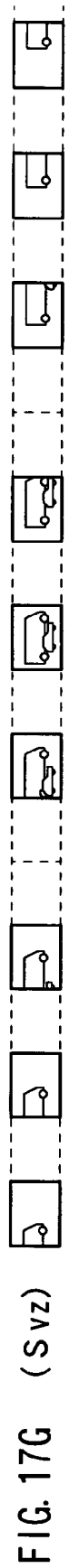
FIG. 17A (DVz)
FIG. 17B (DMz-FRs)
FIG. 17C (DMz-BN)
FIG. 17D (AN)
FIG. 17E (DMz-BN)
FIG. 17F (AN)
FIG. 17G (Svz)

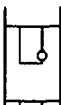
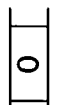
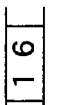
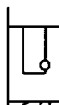
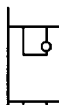
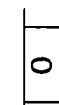
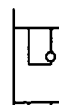
FIG. 18A (DVz)
FIG. 18B (DMz-FRs)
FIG. 18C (DMz-BN)
FIG. 18D (AN)
FIG. 18E (DMz-BN)
FIG. 18F (AN)
FIG. 18G (Svz)
FIG. 18H (DMz-BN)
FIG. 18I (AN)
FIG. 18J (Svz)
FIG. 18K (DMz-BN)
FIG. 18L (AN)
FIG. 18M (Svz)

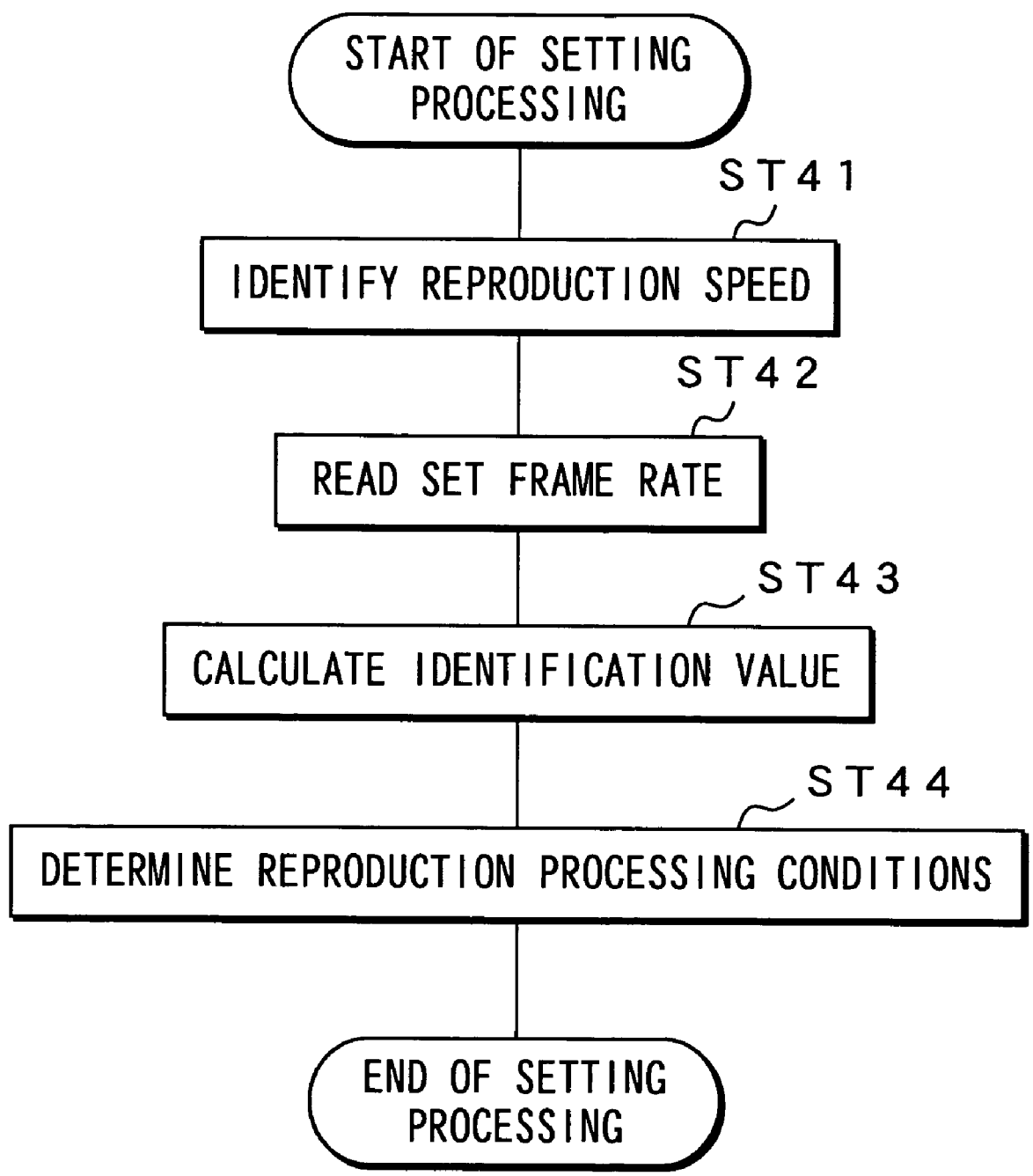

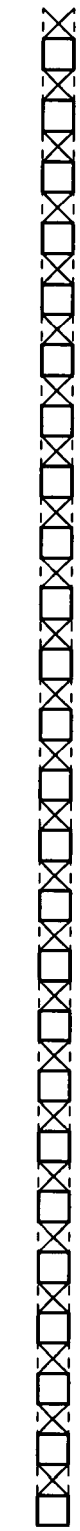
FIG. 20A (AN)
FIG. 20B (DMz-FRs)
FIG. 20C (DMz-BN)
FIG. 20D (Svz)
FIG. 20E (Saz)

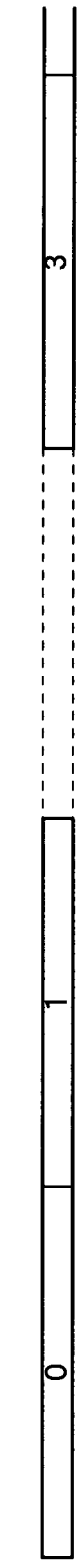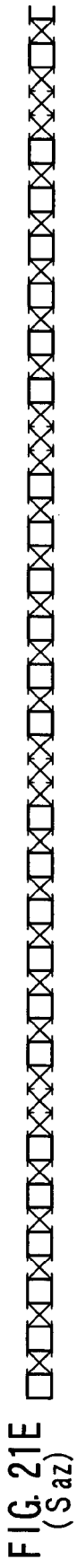
FIG. 21A (AN)
FIG. 21B (DMz-FRs)
FIG. 21C (DMz-BN)
FIG. 21D (Svz)
FIG. 21E (Saz)

TRANSMISSION DEVICE, TRANSMISSION METHOD, REPRODUCTION DEVICE, REPRODUCTION METHOD, PROGRAM, AND RECORDING MEDIUM

TECHNICAL FIELD

The present invention relates to an apparatus and method for transmission, an apparatus and method for reproduction, a program, and a recording medium.

BACKGROUND ART

Conventionally, in generation of image and/or audio contents to be used in a broadcast, contents (or a content) in which a speed of movement of an object is partially varied has been often created in order to achieve results a creator intends.

In this generation of the contents in which the speed of movement of the object is varied partially, for example, the contents are generated by setting it at a frame rate higher than a reference frame rate and then reproduced at the reference frame rate, thereby generating the contents expressing the movement of the object slow. Further, the contents are generated by setting it at a frame rate lower than the reference frame rate and then reproduced at the reference frame rate, thereby generating the contents expressing the movement of the object fast. Furthermore, by adjusting a frame rate to be set or a frame rate for reproduction, the speed of movement of the object can be varied at will.

In such a manner, the creator generates broadcast contents using not only the contents generated at the reference frame rate but also the contents having a varied speed of movement of the object, in order to achieve results he or she intends when the contents are reproduced at the reference frame rate.

Further, a video camera that can contract and expand a time axis to generate the contents having a varied frame rate in such a manner is described in, for example, Jpn. Pat. Appln. KOKAI Publication No. Hei 11-177930.

On the other hand, with an increase in bandwidth and a decrease in cost of a communication network, it has been put to practical use to transmit contents via this communication network interactively. In transmission of the contents via the communication network, the transmitted contents are stored in a buffer temporarily and then reproduced, thereby absorbing variations occurring over the communication network (fluctuations in arrival of data) to continuously reproduce the contents. Further, with an increase in bandwidth of the communication networks, a larger amount of data can be transmitted.

However, even in this interactive transmission for the contents, as in the case of broadcasting, the contents generated so that an intended result may be achieved when they are reproduced at the reference frame rate have been used as the transmit contents. Therefore, even if the reproduction is performed at a desired speed that is different from the creator's intended speed, a portion of such the contents generated at a varied frame rate cannot be reproduced at the desired speed.

DISCLOSURE OF THE INVENTION

A transmission apparatus related to the present invention comprises transmit data generation means for generating transmit data by linking to main data representing an image and/or audio accessory information including information on a frame rate of this main data, and transmission processing means for performing output processing on the transmit data via a transmission channel.

A transmission method related to the present invention comprises a transmit data generation step for generating transmit data by linking to main data representing an image and/or audio accessory information including information on a frame rate of this main data, and a transmission processing step for performing output processing on the transmit data via a transmission channel.

A reproduction apparatus related to the present invention comprises setting means for, based on information of a frame rate of transmit data composed by linking to main data representing an image and/or audio accessory information including information of a frame rate of this main data, setting a variable reproduction range indicating a range of the frame rate of the main data to be reproduced; and reproduction means for reproducing the main data at a frame rate in the variable reproduction range.

A reproduction method related to the present invention comprises a setting step for, based on information of a frame rate of transmit data composed by linking to main data representing an image and/or audio accessory information including information of a frame rate of this main data, setting a variable reproduction range indicating a range of the frame rate of the main data to be reproduced, and a reproduction step for reproducing the main data at a frame rate in the variable reproduction range.

A program related to the present invention causes a computer to perform a transmission method, the method comprising: a transmit data generation step for generating transmit data by linking to main data representing an image and/or audio accessory information including information on a frame rate of this main data; and a transmission processing step for performing output processing on the transmit data via a transmission channel. It also causes a computer to perform a reproduction method, the method comprising: a setting step for, based on information of a frame rate of transmit data composed by linking to main data representing an image and/or audio accessory information including information of a frame rate of this main data, setting a variable reproduction range indicating a range of the frame rate of the main data to be reproduced; and a reproduction step for reproducing the main data at a frame rate in the variable reproduction range.

A recording medium related to the present invention records main data representing an image and/or sound with accessory information including information of a frame rate of this main data being linked to the main data.

According to the present invention, to main data representing an image and/or sound, accessory information including information of a frame rate of this main data is linked so that they can be output as transmit data. It is to be noted that the main data is stored, for example, temporarily, which main data thus stored is read in accordance with a band of a transmission channel to adjust a frame rate of the main data, so that in accordance with this frame rate adjustment, the frame rate information included in the accessory information is modified and linked. This accessory information includes information indicating a recommended reproduction speed of the main data and information indicating a maximum speed at which the main data can be reproduced. Further, as the accessory information, at least frame rate information and frame identification information of each frame included in a reference frame period are linked to the 1 main data, so that by utilizing this frame identification information, reading of the main data is controlled in accordance with an informed band, thereby adjusting the frame rate of the main data.

In a case where the main data is reproduced using the transmit data in which the accessory information is linked to the main data, based on information of a frame rate, a variable reproduction range indicating a range of the frame rate of the main data to be reproduced is set, so that at a frame rate within this variable reproduction range the main data is reproduced. Further, in a case where the accessory information includes information indicating a recommended reproduction speed of the main data and a reproduction speed is not specified by a user, the main data is reproduced at this recommended reproduction speed. Further, in a case where the accessory information includes information indicating a maximum speed at which the main data can be reproduced, a variable reproduction speed range is set using the information indicating the maximum speed. Further, the accessory information includes frame identification information of each frame included in the reference frame period, so that by thinning out or repeating this main data by utilizing the frame identification information, the reproduction speed of the main data is varied.

According to the present invention, to the main data representing an image and/or sound, accessory information including information of a frame rate of this main data is linked and output as the transmit data. Further, when reproducing the main data using this transmit data, based on the frame rate information included in the accessory information, a variable reproduction range indicating a range of the frame rate of the main data to be reproduced is set, so that at a frame rate in this variable reproduction range the main data is reproduced. Therefore, by linking the accessory information to a portion of the contents, which can be reproduced in a range of a speed different from that intended by a creator of the contents, that portion can be reproduced at this different speed.

Further, the main data is stored temporarily and then read in accordance with a band of a transmission channel, thereby adjusting a frame rate of the main data. Thus, the frame rate of the main data can be adjusted easily. Further, it is possible to prevent an image or sound from being interrupted during reproduction. Furthermore, in accordance with adjustment of the frame rate, frame rate information contained in the accessory information is modified, so that the accessory information corresponding to the main data to be transmitted can be linked to it.

Further, if a reproduction speed including information indicating a recommended reproduction speed of main data is not specified in the accessory information when the main data is reproduced, the main data is reproduced at a recommended reproduction speed, so that this reproduction speed thereof can be specified by a creator side of the main data.

Further, information indicating a maximum speed at which the main data can be reproduced is included in the accessory information as well as a variable reproduction speed range are set using this information indicating the maximum speed when the main data is reproduced, so that the variable reproduction speed range can be regulated by the creator side of the main data.

Furthermore, as the accessory information, at least frame rate information and frame identification information of each frame included in the reference frame period are linked to the main data, so that by utilizing this frame identification information, a frame rate of the main data is adjusted to generate transmission data. Further, when the main data is reproduced using transmission data, by utilizing the frame identification information, the main data is thinned out or repeated to vary a reproduction speed of the main data. Therefore, the main data can be reproduced at a desired speed according to a simple configuration.

BRIEF DESCRIPTION OF THE DRAWINGS

FIG. 4 is a diagram for showing another configuration of the image pick-up apparatus;

FIGS. 5A-5E are diagrams each for showing a (first) relationship between image data and accessory information;

FIGS. 6A-6E are diagrams each for showing a (second) relationship between image data and accessory information;

FIG. 7 is a diagram for showing a configuration of an editing apparatus;

FIG. 15 is a flowchart for showing an operation of setting reproduction processing conditions to an image;

FIGS. 16A-16M are diagrams each for showing a (first) image reproduction operation;

FIGS. 17A-17G are diagrams each for showing a (second) image reproduction operation;

FIGS. 18A-18M are diagrams each for showing a (third) image reproduction operation;

FIG. 19 is a flowchart for showing an operation of setting reproduction processing conditions to sound;

FIGS. 20A-20E are diagrams each for showing a (first) audio reproduction operation; and FIGS. 21A-21E are diagrams each for showing a (second) audio reproduction operation.

BEST MODE FOR CARRYING OUT THE INVENTION

Figure 1:
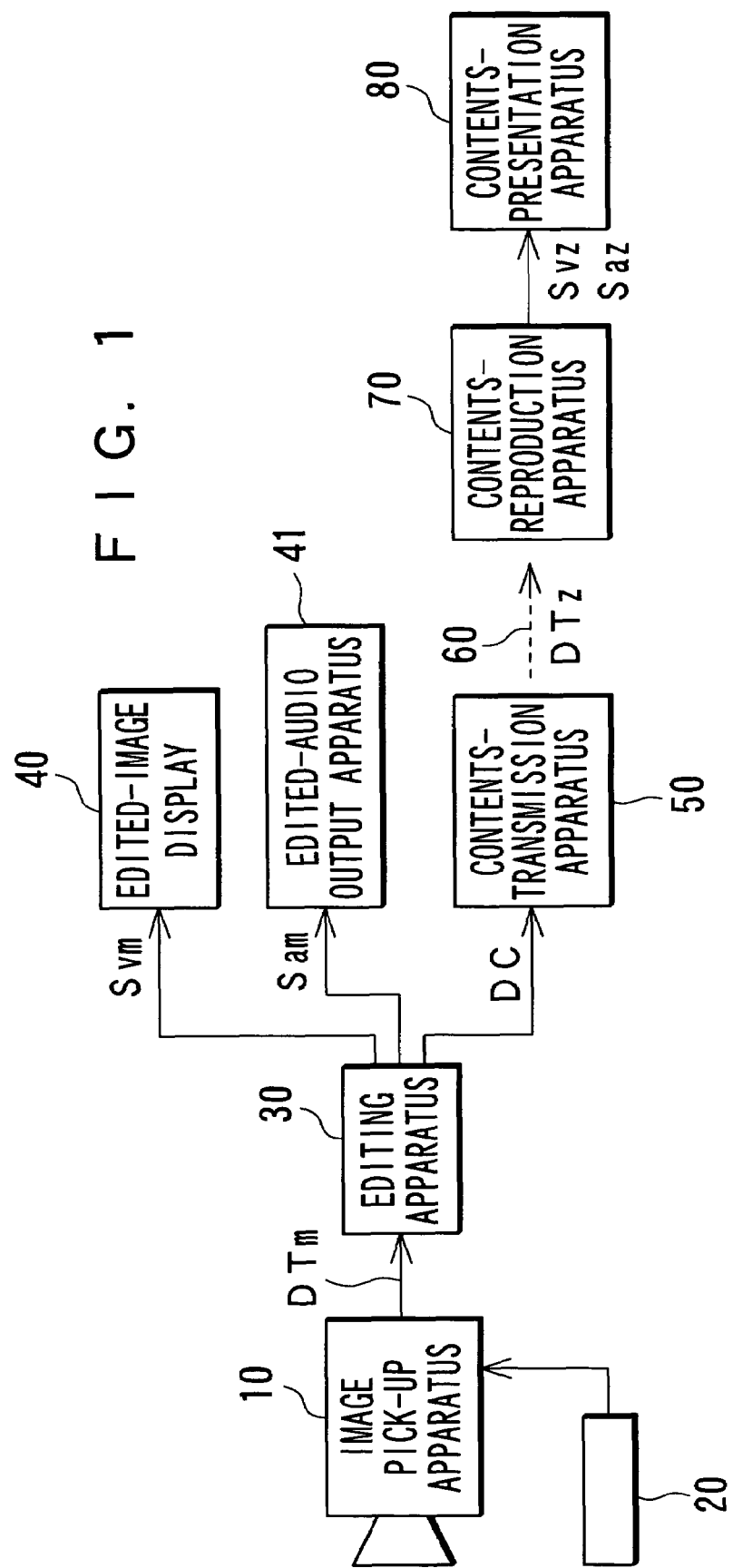
FIG. 1 is a diagram for showing an overall configuration of a contents-transmission system.

The following will describe the present invention with reference to accompanying drawings. FIG. 1 shows an overall configuration of a contents-transmission system for transmitting contents (or a content), for example, image and/or audio contents. An image pick-up apparatus 10 generates image data having a varied frame rate and links accessory information associated with this image data thereto and then supplies it as materials-data DTm to an editing apparatus 30. Further, when equipped with an audio input apparatus 20, the image pick-up apparatus 10 generates audio data and supplies this audio data also to the editing apparatus 30 as materials-data DTm. It is to be noted that the materials-data DTm may be supplied not only from the image pick-up apparatus 10 but also from any other appliances.

The editing apparatus 30 performs edit processing by using the supplied materials-data DTm, to generate data which represents images and/or sound desired by an editor. Further, the data representing the images and/or sound is provided as main data and, accessory information is linked to this main data to generate contents data DC for transmission, which is supplied to a contents-transmission apparatus 50.

The editing apparatus 30 generates an image signal Svm associated with editing and supplies it to an edited-image display 40. Accordingly, a user can confirm image edit processes, results, etc. using an image displayed on the edited-image display 40. Similarly, it generates an audio signal Sam associated with editing and supplies it to an edited-audio output apparatus 41. Thus, the user can confirm audio edit processes, results, etc. using a sound output from the edited-audio output apparatus 41.

A contents-transmission apparatus 50 accumulates contents-data DC supplied from the editing apparatus 30. Further, if receiving a request for contents-data from, for example, a contents-reproduction apparatus 70, it adjusts a frame rate of the contents-data in accordance with a band of a transmission channel 60, generates transmit data DTz based on the contents-data after being adjusted in terms of frame rate, and supplies this transmit data DTz to the contents-reproduction apparatus 70 via the wireline or wireless transmission channel 60.

The contents-reproduction apparatus 70 generates an image signal Svz or an audio signal Saz of the contents based on the transmit data DTz supplied via the transmission channel and supplies it to a contents-presentation apparatus 80. Further, the contents-reproduction apparatus 70 controls reproduction operation of the contents based on the accessory information.

The contents-presentation apparatus 80 displays an image based on the image signal Svz or outputs a sound based on the audio signal Saz, thereby presenting the contents.

Regarding linkage, in this context, it may be such a condition that the main data and the accessory information including a frame rate concerning this main data are linked to each other. For example, even if the main data and the accessory information have been transmitted via different transmission channels, they can be correlated with each other as far as a frame number corresponding to the accessory information is contained therein. The linkage in the present embodiment includes such a case.

Figure 2:
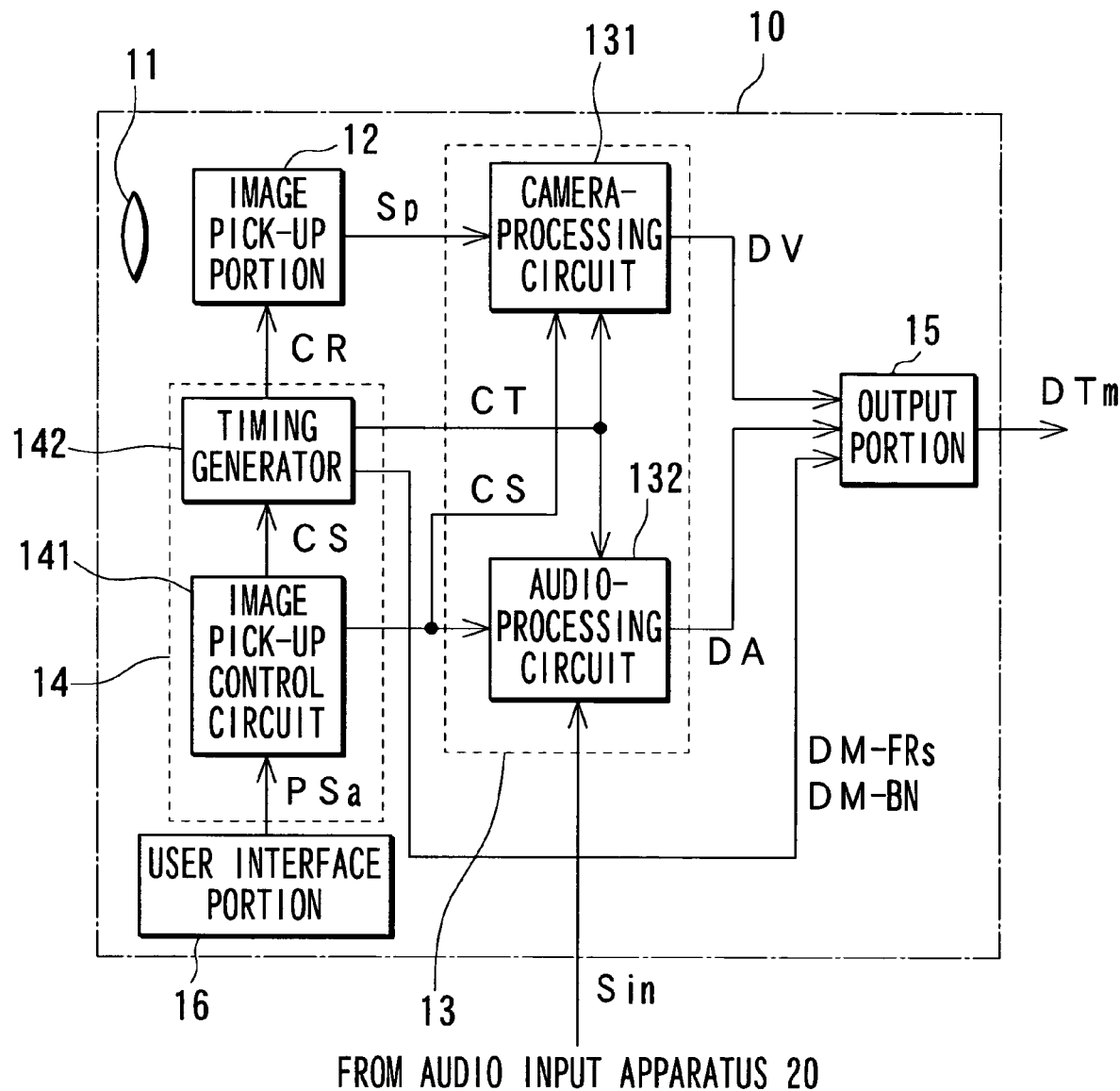
FIG. 2 is a diagram for showing a configuration of an image pick-up apparatus.

FIG. 2 shows a configuration of an image pick-up apparatus 10. Light passing through an image pick-up lens system 11 impinges on an image pick-up portion 12, so that an image of an object is formed on an image pick-up surface of an image pick-up device such as a charge coupled device (CCD) equipped to the image pick-up portion 12. The image pick-up device generates imaged charge of the object image by utilizing photoelectric transfer. Further, the image pick-up portion 12 reads the imaged charge, which has been generated, on the basis of a drive signal CR from a timing generator 142, described later, generates an image pick-up signal Sp of a frame rate in accordance with the drive signal CR, and supplies it to a camera-processing circuit 131 in a signal-processing portion 13.

The camera-processing circuit 131 performs a various kinds of signal processing at a timing synchronized with the image pick-up signal Sp based on a timing signal CT supplied from the timing generator 142. For example, the camera processing circuit 131 performs processing to filter out a noise component from the image pick-up signal Sp by utilizing correlated double sampling etc., processing to convert the noise-free image signal Sp into digital image data, processing to clamp the image data, shading correction or defect correction of the image pick-up device, γ processing or profile compensation processing, Knee correction processing, etc. Further, the camera processing circuit 131 performs various kinds of signal processing under processing conditions that are based on an operation control signal CS supplied from an image pick-up control circuit 141 in a control portion 14 or the like. In such a manner, image data DV obtained as a result of the various kinds of signal processing performed at the camera-processing circuit 131 is supplied to an output portion 15.

The timing generator 142 in the control portion 14 generates the drive signal CR in accordance with the operation control signal CS from the image pick-up control circuit 141 and supplies it to the image pick-up portion 12 to thus vary a cycle at which the imaged charge is read at the image pick-up portion 12, thereby regulating a frame rate of the image pick-up signal Sp to a set frame rate FRs based on an operation signal PSa from a user interface portion 16. The timing generator 142 conducts such control that, by assuming, for example, a frame frequency of 59.94 Hz or 29.97 Hz in the case of NTSC system or a frame frequency of 50 Hz or 25 Hz in the case of the PAL system as a frame frequency of a reference frame rate FRr, a frame rate of the image pick-up signal Sp may be k (which is a positive value but not limited to an integer) times the reference frame rate FRr if an operation to make the set frame rate FRs k times the reference frame rate FRr is performed. It is to be noted that the cycle for reading the imaged charge is varied by, for example, altering a cycle of a read pulse (sensor gate pulse) for moving the imaged charge accumulated in each pixel of the image pick-up device such as a CCD to a transfer portion, thereby varying the frame rate. Further, in this case, the common data rate (CDR) method may be employed. By using the CDR method, valid frame rates can be varied while the frame rate of a signal output from the CCD stays unchanged, thereby setting a processing rate of the camera-processing circuit 131 etc. constant. This CDR method is disclosed in PCT application No. PCT/JP03/00551, filed on 2003 Jan. 22.

Further, the timing generator 142 generates the timing signal CT synchronized with the drive signal CR and supplies it to the camera-processing circuit 131 and the audio-processing circuit 132. Furthermore, the timing generator 142 generates frame rate information DM-FRs indicating the set frame rate FRs, which is a frame rate of image data DV, and supplies it to the output portion 15. Further, the timing generator 142 generates a sub-frame number BN. This sub-frame number BN is a number that enables to be identified each frame included in a frame period of the reference frame rate FRr when the set frame rate FRs is set higher than the reference frame rate FRr. This sub-frame number BN is supplied to the output portion 15 as frame identification information DM-BN.

Figure 3:
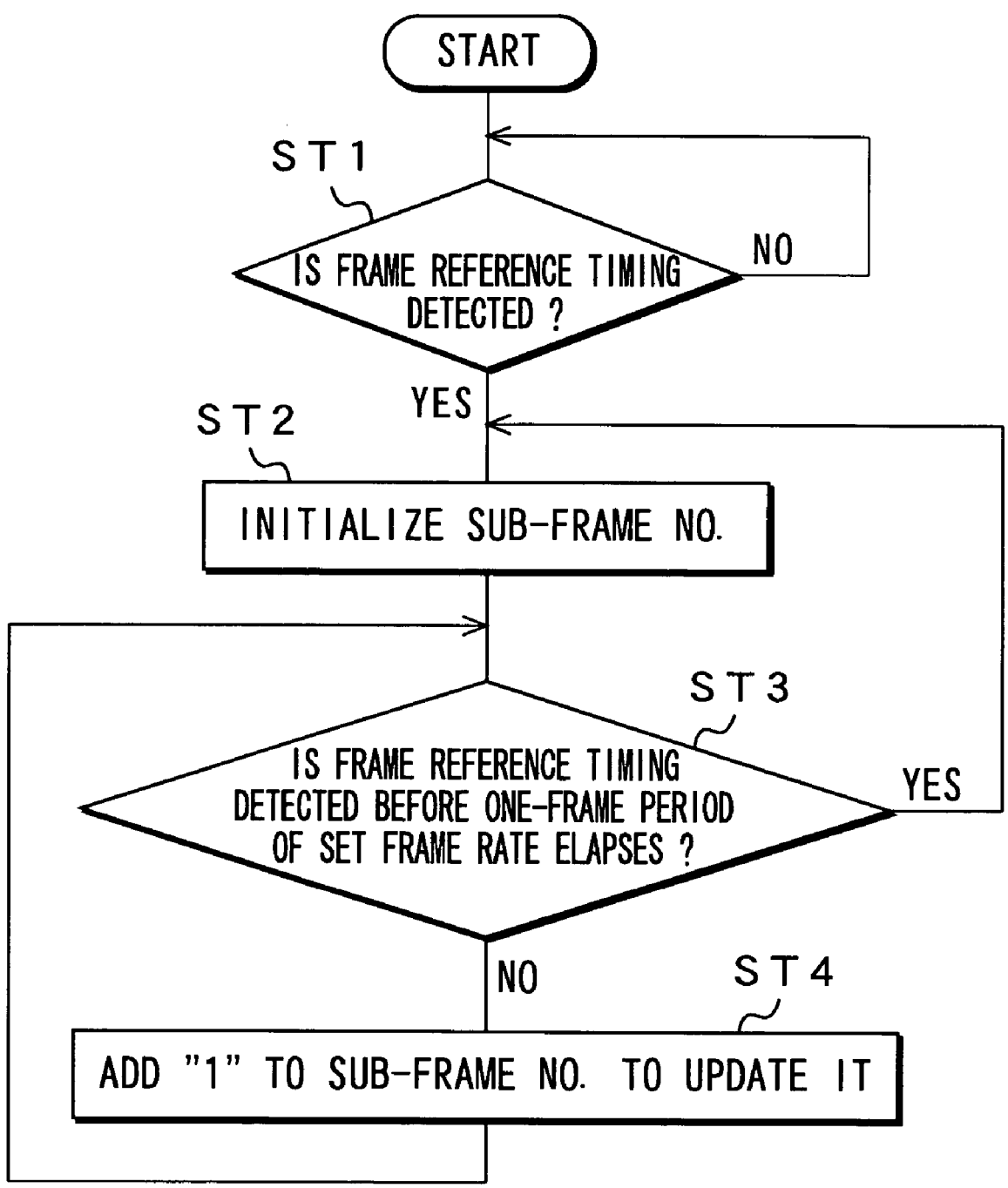
FIG. 3 is a diagram for showing an operation of adding a sub-frame number.

FIG. 3 is a flowchart for showing an operation of adding the sub-frame number at the timing generator 142. The timing generator 142 divides an oscillation frequency having, for example, a predetermined frequency and sets a frame period of the reference frame rate FRr and that of the set frame rate FRs so that they can be synchronized with each other, thereby generating the drive signal CR and a frame reference timing that indicates a breakpoint of the frame period of the reference frame rate FRr, based on the frame period of the set frame rate FRs.

The timing generator 142 identifies whether the frame reference timing is detected at step ST1. If the frame reference timing is detected, the process goes to step ST2. If no frame reference timing is detected, the process returns to step ST1.

If the frame reference timing is detected at step ST1 and the process goes to step ST2, the timing generator 142 initializes the sub-frame number BN at step ST2 so that the sub-frame number BN is set to, for example, "0" and the process goes to step ST3.

At step ST3, the timing generator 142 identifies whether the frame reference timing is detected during a one-frame period of time lapse of the set frame rate FRs starting from a moment of detection of the frame reference timing. If no frame reference timing is detected, the process goes to step ST4 where the timing generator 142 adds "1" to the sub-frame number BN to update it and the process then returns to step ST3. In such a manner, if no frame reference timing is detected during a one-frame period of time lapse of the set frame rate FRs, the sub-frame numbers BN are sequentially assigned every one-frame period of the set frame rate FRs.

Then, if the frame reference timing is detected before a one-frame period of the set frame rate FRs elapses, the process returns to step ST2 to initialize the sub-frame number BN.

Therefore, in each frame period of the reference frame rate FRr, the sub-frame number BN can be added to a frame image in the set frame rate FRs which is provided during this frame period.

To the image pick-up control circuit 141 in the control portion 14 shown in FIG. 2, the user interface portion 16 is connected. If the image pick-up apparatus 10 switches its operation or varies a frame rate, the user interface portion 16 generates an operation signal PSa in accordance with these operations and supplies it to the image pick-up control circuit 141. Further, the user interface 16, if supplied with the operation signal PSa from an external appliance such as a remote controller, not shown, supplies this operation signal PSa to the image pick-up control circuit 141.

Based on the operation signal PSa from the user interface portion 16, the image pick-up control circuit 141 generates the control signal CS so that the image pick-up apparatus 10 may operate in accordance with the operation signal PSa and supplies it to the camera-processing circuit 131 and the timing generator 142.

The audio-processing circuit 132 is supplied with an analog audio signal Sin from the audio input apparatus 20. The audio-processing circuit 132 performs sampling processing on the audio signal Sin based on the timing signal CT supplied from the timing generator 142 to generate digital audio data DA and supplies it to the output portion 15.

The output portion 15 generates accessory information DM including frame rate information DM-FRs and frame identification information DM-BN and links it to the image data DV and the audio data DA to generate materials-data DTm and supplies it to the editing apparatus. It is to be noted that by recording in a recording medium the materials-data DTm or a record signal generated on the basis of the materials-data DTm, it is possible to reproduce the recording medium in which this materials-data DTm or the record signal generated on the basis of the materials-data DTm, thereby supplying the materials-data DTm to the editing apparatus via the recording medium. Further, the accessory information DM may contain not only information on the set frame rate FRs and the sub-frame number BN but also information indicating an imaged date/time, image conditions, image details, etc.

As one example of a method for linking the accessory information DM to the image data DV or the audio data DA, such an approach may be considered for, when the image data DV or the audio data DA is compressed to generate materials-data DTm as a data stream, inserting the accessory information DM into the data stream of an image or inserting the accessory information DM into a header of the data stream.

Further, in the case of using an SDI format standardized as SMPTE (Society of Motion Picture and Television Engineers) 259M "Television—10-Bit 4:2:2 Component and 4fsc Composite Digital Signals—Serial Digital Interface" to transmit non-compressed image data or audio data, an SDTI format standardized as SMPTE305M "Television—Serial Data Transport Interface (SDTI)" to transmit compressed image data or audio data, or an SDTI-CP format standardized as SMPTE326M "Television—SDTI Content Package Format (SDTI-CP)" which is a further restricted version of the SDTI format, the accessory information DM is given as data of an UMID standardized as SMPTE330M "Television—Unique Material Identifier (UMID)" and inserted into a signal in each of the formats. It is to be noted that the method of linking the accessory information to the image data DV or the audio data DA is not limited to it but a variety of other methods may be considered. Further, linkage may require only that a relationship between one and another can be known by any means, that is, they can be linked to each other. For example, even if they are sent through different transmission channels, they can be correlated to each other as far as they are provided with the same UMID, which case is also categorized as linkage.

Note here that the above-mentioned image pick-up apparatus 10 varies a cycle for reading imaged charge at the image pick-up portion 12 to thereby generate materials-data DTm having a desired set frame rate FRs, so that the set frame rate FRs can be varies continuously. However, if the set frame rate FRs needs only to be varied step-wise, the materials-data DTm having a desired set frame rate FRs can be generated by thinning out frames. That is, by generating image data DVa having a constant frame rate higher than the set frame rate FRs and extracting image data as much as the set frame rate FRs from this image data DVa, it is possible to generate the image data DV having the set frame rate FRs. A configuration in this case is shown in FIG. 4. It is to be noted that in FIG. 4, components that corresponds to those of FIG. 2 are indicated by the same symbols and their detailed description is omitted.

A timing generator 182 in a control portion 18 generates a drive signal CRa in accordance with a maximum value of the set frame rate FRs, which is set via the user interface portion 16, and supplies it to the image pick-up portion 12. The image pick-up portion 12 generates, based on the drive signal CRa, an image pick-up signal, i.e., an image pick-up signal Spa having a fixed frame rate FRq higher than the reference frame rate FRr and supplies it to the camera-processing circuit 131 in the signal processing portion 17. If the set frame rate FRs can be changed up to n (which is positive) times the reference frame rate FRr, the image pick-up portion 12 generates an image pick-up signal Spa having n times the reference frame rate FRr and supplies it to the camera-processing circuit 131. That is, the image pick-up portion 12 generates the image pick-up signal Spa having a fixed frame rate without being influenced by the set frame rate FRs which is set via the user interface portion 16.

Further, the timing generator 182 generates a timing signal CTa synchronized with the drive signal CRa and supplies it to the camera-processing circuit 131, the audio-processing circuit 132, and a valid frame signal generation circuit 183 in the signal processing portion 17.

The camera-processing circuit 131 supplies a valid data picking circuit 171 with image data DVa having the fixed frame rate FRq generated on the basis of the image pick-up signal Spa. The audio-processing circuit 132 supplies the valid data picking circuit 171 with audio data DAa generated by performing sampling based on the timing signal CTa having a constant frequency.

The image pick-up control circuit 181 generates a set information signal CF indicating a set frame rate FRs based on the operation signal PSa from the user interface portion 16 and supplies it to the valid frame signal generation circuit 183.

The valid frame signal generation circuit 183 generates an extraction control signal CC for extracting data from the image data DVa by the frame unit to generate image data DV having the set frame rate FRs, based on a ratio between a frame rate FRq that is a constant value of the image data DVa and a set frame rate FRs indicated by the set information signal CF. Furthermore, the valid frame signal generation circuit 183 supplies the valid data picking circuit 171 with this extraction control signal CC in synchronization with the timing signal CTa. For example, if a frame rate FRq of the image data DVa is n times the reference frame rate FRr and a set frame rate FRs is (n/2) of the reference frame rate FRr, the valid frame signal generation circuit 183 generates the extraction control signal CC for extracting data from the image data DVa every other frame by frame unit and supplies it to the valid data picking circuit 171 in synchronization with the timing signal CTa.

Further, the valid frame signal generation circuit 183 generates frame rate information DM-FRs indicating a set frame rate FRs based on the set information signal CF and supplies it to the output portion 15. Furthermore, since the number of frames in a frame period having the reference frame rate FRr can be identified by the extraction control signal CC, the valid frame signal generation circuit 183 sets a sub-frame number BN to each of the frames in each frame period having the reference frame rate FRr and supplies this sub-frame number BN also to the output portion 15 as frame identification information DM-BN.

The valid data picking circuit 171 extracts the image data DVa and thw audio data DAa of a frame indicated by the extraction control signal CC and supplies them as image data DV and audio data DA respectively to the output portion 15. Further, although not shown, the valid frame signal generation circuit 183 supplies the valid data picking circuit 171 with frame rate information DM-FR indicating a set frame rate FRs, so that the valid data picking circuit 171 may thin out the audio data DAa in accordance with a ratio between the set frame rate FRs and a frame rate at which the audio data DAa has been generated. For example, if a frame rate FRq at which the audio data DAa has been generated is n times the reference frame rate FRr and the set frame rate FRs is (n/2) of the reference frame rate FRr, it thins out the audio data DAa for every other sample. In this case, a thinning-out interval can be made smaller than that in the case of thinning out the audio data by frame unit, so that a sound based on the audio data DA can be provided with a better sound quality.

In such a manner, by making the frame frequency of the image data DVa constant, it becomes unnecessary to vary an operating frequency at the image pick-up portion 12 or the camera-processing circuit 131 in the signal-processing portion 17, thereby simplifying a configuration of the image pick-up portion 12 and that of the camera-processing circuit 131. Further, only by extracting data from the image data DVa by frame unit, image data DV having a set frame rate FRs can be generated, so that the image data DV having a desired set frame rate FRs can be easily generated from the image data DVa.

Further, the image pick-up apparatus may be provided with an image memory or an adder and a divider to add up image data for each predetermined number of frames, thereby generating the image data DV. In this case, a variable range of the frame rate of the image signal Sp can be made smaller. That is, by adding up n number of frames of the image signal Sp and dividing a signal level by n, it is possible to obtain a signal having the frame rate (1/n) even if the frame rate of the image pick-up signal Sp is not divided by n.

FIGS. 5A-5E and FIGS. 6A-6E are explanatory illustrations of relationships between the image data DV generated at the image pick-up apparatuses 10 and 10a and the accessory information DM. As shown in FIG. 5A, by making a set frame rate FRs equal to the reference frame rate FRr or twice it, to image data DV shown in FIG. 5B (in this figure, a frame image based on the image data DV is shown), accessory information DM which contains frame rate information DM-FRs of FIG. 5C showing the set frame rate FRs and frame identification information DM-BN of FIG. 5D showing the sub-frame number BN is linked. It is to be noted that FIG. 5E shows a relationship between a lapse of time and a frame image. Further, the frame rate information DM-FRs may indicate not only the set frame rate FRs but also a magnification of the set frame rate FRs with respect to the reference frame rate FRr. The frame rate information DM-FRs shown in FIG. 5C and the subsequent indicates the magnification thereof.

If a set frame rate FRs is made equal to the reference frame rate FRr or half that, as shown in FIG. 6A, to image data DV shown in FIG. 6B (in this figure, a frame image based on the image data DV is shown), accessory information DM which contains frame rate information DM-FRs of FIG. 6C showing the set frame rate FRs and frame rate information DM-BN of FIG. 6D showing the sub-frame number BN is linked. FIG. 6E shows a relationship between a lapse of time and a frame image.

The following will describe the editing apparatus 30. FIG. 7 shows a configuration of the editing apparatus 30. Materials-data DTm supplied to the editing apparatus 30 is supplied to an information detection circuit 311 in a materials-take-in portion 31. The information detection circuit 311 detects accessory information DM from the materials-data DTm. This detected accessory information DM is supplied to a data-basing processing circuit 312. Further, image data DV and audio data DA contained in the materials-data DTm are supplied to the data-basing processing circuit 312.

The data-basing processing circuit 312 correlates the image data DV and the audio data DA with the accessory information DM detected by the information detection circuit 311 and stores them in a data storage 321 in an edit processing portion 32. Further, based on the accessory information DM stored in the data storage 321 and the image data DV and the audio data DA correlated with this accessory information DM, the data-basing processing circuit 312 generates database information DB that enables details of the materials-data to be easily confirmed and supplies it to an edit control portion 33. For example, the database information DB comprises information for enabling details of materials-data (e.g., thumbnail) to be identified, time length of the materials-data, a set frame rate FRs, a sub-frame number BN, and information such as storage locations in the data storage 321.

The edit control portion 33 generates image data DVg for enabling edit processing to be carried out in a GUI (Graphical User Interface) environment and image data DVi for displaying details of database information and supplies them to an image output signal generation circuit 351. The image output signal generation circuit 351 generates an image signal Svm based on the supplied image data pieces DVg and DVi and outputs it to the edited-image display 40. By thus supplying the image signal Svm to the edited-image display 40, it is possible to display what-like materials-data is stored etc. on a screen of the edited-image display 40.

Further, the edit control portion 33 controls post-production processing. That is, a user interface portion 34 connected to the edit control portion 33 supplies an operation signal PSe that utilizes display in the GUI environment, so that if the operation signal PSe instructs to select any materials-data, the edit control portion 33 generates a read control signal RC in accordance with this operation signal PSe and supplies it to a read/write processing circuit 322 in an edit processing portion 32. Further, if the operation signal PSe involves an edit operation such as working or combination of read materials-data, the edit control portion 33 generates an edit control signal ET in accordance with the operation signal PSe and supplies it to a signal edit circuit 323 in the edit processing portion 32. Furthermore, when editing of the materials-data is finished to complete contents-data and if the operation signal PSe indicates an operation to store the contents-data in the data storage 321, the edit control portion 33 generates a write control signal WC in accordance with the operation signal PSe and supplies it to the read/write processing circuit 322. Further, if the operation signal PSe indicates output of the contents-data, the edit control portion 33 generates an output control signal RP in accordance with the operation signal SPe and supplies it to the read/write processing circuit 322. If the operation signal PSe regulates a speed range for reproduction of the contents-data, the edit control portion 33 generates a speed range setting signal LP in accordance with the operation signal PSe and supplies it to the signal edit circuit 323.

The read/write processing circuit 322 reads requested materials-data from the data storage 321 based on the read/write control signal RC and supplies it to the signal edit circuit 323. Further, the read/write processing circuit 322 stores the completed contents-data DC in the data storage 321 based on the write control signal WC. Further, the read/write processing circuit 322 reads requested contents-data DC from the data storage 321 based on the output control signal RP and outputs it.

The signal edit circuit 323 performs edit processing such as processing, combining, and deleting of images and audio based on the edit control signal ET, using the image data DV and/or the audio data DA contained in the materials-data read from the data storage 321. In this process, the signal edit circuit 323 supplies the image output signal generation circuit 351 with image data DVe which is before or after being edited or being edited and supplies an audio output signal generation circuit 352 with audio data DAe which is before or after being edited or being edited. Further, when altering a frame rate of image data DV or audio data DA in edit processing, the signal edit circuit 323 alters accessory information DM also in such a manner that it may match the image data and the audio data as edited. Furthermore, the signal edit circuit 323 generates contents-data DC by interlinking edited image data DV or audio data DA and accessory information DMc that includes frame rate information DM-FRs indicating set frame rate FRs corresponding to the edited image data DV or audio data DA and frame identification information DM-BN. When supplied with the speed range setting signal LP, the signal edit circuit 323 links also speed range information that indicates a reproduction speed range of the contents-data DC as the accessory information DMc based on this speed range setting signal LP. Furthermore, the signal edit circuit 323, when receiving a title and a recommended reproduction speed of contents from the user interface portion 34, links such the information as the accessory information DMc. Further, when obtaining reproduction time length information of the contents-data in edit processing, this information may also be linked as the accessory information DMc. Furthermore, when receiving a maximum possible reproduction speed of contents-data, this maximum speed is also linked as the accessory information DMc. Further, no sub-frame number BN is added to materials-data, the signal edit circuit 323 or the edit control portion 33 performs the above-mentioned processing shown in FIG. 3, to set a sub-frame number BN, thereby providing frame identification information DMc-BN.

The image output signal generation circuit 351 in the edit output signal generation portion 35, as described above, generates an image signal Svm based on image data DVg and DVi supplied from the edit control portion 33 and supplies it to the edited-image display 40. Therefore, information concerning materials-data can be displayed in the GUI environment. Furthermore, the image output signal generation circuit 351 generates the image signal Svm based on the image data DVe supplied from the signal edit circuit 323. Accordingly, the user can confirm images which are before or after being edited or being edited, on the screen of the edited-image display 40.

The audio output signal generation circuit 352 converts audio data DAe supplied from the signal edit circuit 323 into an analog audio signal Sam and supplies it to the edited-audio output apparatus 41 constituted of, for example, a speaker or headphone according to a desired signal level. Accordingly, the user can confirm sounds which are before or after being edited or being edited according to a sound output from the edited-audio output apparatus 41.

When, in such a manner, post-production processing by use of the materials-data DTm is performed at the editing apparatus 30 to complete contents-data DC, this completed contents-data DC is supplied to the contents-transmission apparatus 50 and then, from this contents-transmission apparatus 50 it is supplied to the contents-reproduction apparatus 70 of the user.

Figure 8:
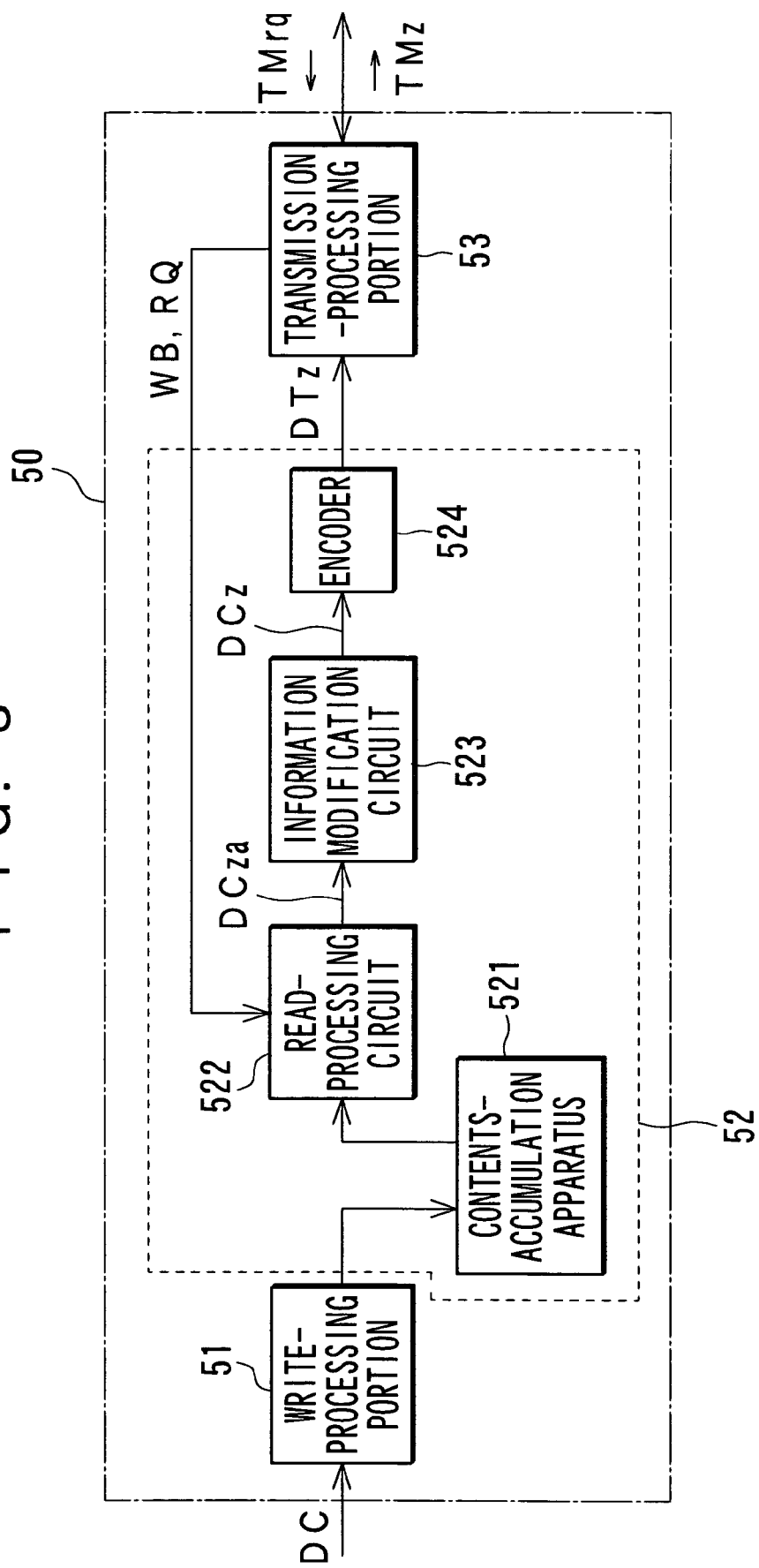
FIG. 8 is a diagram for showing a configuration of a contents-transmission apparatus.

FIG. 8 shows a configuration of the contents-transmission apparatus 50. The transmit contents-data DC supplied from the editing apparatus 30 is supplied to a write-processing portion 51. The write-processing portion 51, which is connected to a contents-accumulation apparatus 521 in a transmit data generation portion 52, stores the supplied transmit contents-data in the contents-accumulation apparatus 521. It is to be noted that contents-data DC is not limited to that supplied from the editing apparatus 30; for example, materials-data etc. generated by the image apparatus 10 may be used as the contents-data DC.

The transmit data generation portion 52 is adapted to generate transmit data DTz based on the contents-data DC and includes the contents-accumulation apparatus 521, to which a read-processing circuit 522 is connected. This read-processing circuit 522 receives band information WB of a transmission channel at the time of transmission of the transmit contents-data and contents-request signal RQ from the side of the contents-reproduction apparatus from a transmission-processing portion 53, described later.

The read processing circuit 522, based on the band information WB and the accessory information DMc of requested contents-data accumulated in the contents-accumulation apparatus 521, adjusts a frame rate by controlling reading of the requested contents-data and supplies an information modification circuit 523 with the contents-data DCza after the frame rate is adjusted.

For example, if a quantity of one frame of data is BD number of bits when encoding processing is performed by a later-described encoder 524 and a set frame rate FRs indicated by the frame rate information DMc-FRs is n (which is positive) times the reference frame rate FRr, an amount of data BT transmitted in a unit time is "BT=BD×n×FRr+BH". It is to be noted that the amount of data BH is given as a quantity that includes header information etc. added when the contents-data is transmitted in a packet.

If, in this case, an amount of transmittable data BA (bandwidth) indicated by the band information WB is not smaller than the amount of data BT, the frame rate of the contents-data is not adjusted, so that the contents-data is sequentially read from the contents-accumulation apparatus 521 and supplied to the information modification circuit 523. If the bandwidth BA is smaller than the amount of data BT, on the other hand, the frame rate adjustment is performed on image data etc. in the contents-data, to decrease the amount of data so that an image or a sound may not be interrupted during a streaming operation for reproducing the transmit data with it being received. For example, from a set frame rate FRs indicated by the accessory information DMc and the reference frame rate FRr, a multiple "m" of the set frame rate FRs with respect to the reference frame rate FRr is identified. Furthermore, divisors of the identified multiple "m" are obtained, so that a maximum value of the divisors except "m" and the reference frame rate FRr are multiplied by each other to provide a set frame rate after adjustment. That is, since the maximum divisor value is "5" when "m=10", such frame rate adjustment that "m=5" is performed. In this frame rate adjustment, contents-data in every other frame, that is, the frames having even sub-frame numbers of "0, 2, 4. 6, 8" is read by utilizing the frame identification information DMc-BN, thereby generating contents-data having a frame rate five times the reference frame rate FRr. If "m=9", for example, such frame rate adjustment that "m=3" is performed, at an interval of two frames, that is, contents-data in the frames having sub-frame numbers of "0, 3, 6" is read by utilizing the frame identification information DMc-BN, thereby generating contents-data after having an adjusted frame rate. Further, if the amount of data BT after adjustment is larger than the bandwidth BA, further frame rate adjustment is performed. In such a manner, if the maximum value of the divisors except "m" is used to determine a frame rate after adjustment, only by performing thinning-out operation for each frame utilizing the frame identification information DMc-BN when reading contents-data, the contents-data with the frame rate as adjusted can be generated easily.

Then, if the amount of data BT after adjustment is larger than the bandwidth BA even with "m=1", such a frame thinning-out operation that "m=1/k" (k: natural number) can be performed, thereby further reducing the amount of data BT. Further, if the bandwidth BA is changed, the frame rate is varied in accordance with this change in bandwidth BA.

Further, a sample thinning-out operation is performed on the audio data of the contents-data in accordance with frame rate adjustment for the image data, so that the audio data having an adjusted frame rate can be generated. For example, if the image data is read for every other frame, the audio data is read for every other sample. If the image data is read at an interval of two frames, the audio data is read at an interval of two samples, thereby generating the audio data having an adjusted frame rate.

When frame rate adjustment is performed by the read-processing circuit 522, the information modification circuit 523 modifies accessory information DMza of contents-data DCza so that it may match the adjusted frame rate, thereby providing accessory information DMz that indicates a frame rate properly. Furthermore, contents-data DCz to which this accessory information DMz is linked is supplied to the encoder 524. For example, if "m=10" is adjusted to "m=5", the set frame rate FRs is altered from "X10" to "X5" by modification, so that frame rate information DMza-FRs indicating that the set frame rate FRs is "X10" is changed to frame rate information DMz-FRs indicating that the set frame rate FRs is "X5". Corresponding to this change in the set frame rate FRs, the frame identification information DMza-BN is also changed. That is, it is changed to such frame identification information DMz-BN that sub-frame numbers BN "0-9" are replaced by sub-frame numbers BN "0-4". Furthermore, using these frame rate information DMz-FRs and frame identification information DMZ-BN after being changed, the accessory information DMc is changed to the accessory information DMz.

The encoder 524 encodes the image data DVz and the audio data DAz of the supplied contents-data DCz into a signal suitable for transmission, thereby generating encoded data DZ. For example, using an encoding system standardized as MPEG (Moving Picture Experts Group) 4, they are encoded into a signal suitable for streaming transmission. To the encoded data DZ obtained by this encoding processing, the accessory information DMz is linked and they are supplied as transmit data DTz to the transmission-processing portion 53. In such a manner, by performing encoding processing, it is possible to transmit contents-data efficiently.

When requested for contents-data by a transmit signal TMrq supplied from the contents-reproduction apparatus 70, the transmission-processing portion 53 supplies the read-processing circuit 522 with the contents-request signal RQ that indicates the requested contents-data. Further, the transmission-processing portion 53 generates the band information WB concerning a band of the transmission channel 60 and supplies it to the read-processing circuit 522. Furthermore, based on the request for the contents-data, the transmission-processing portion 53 supplies the transmit data DTz supplied from the encoder 524 as a transmit signal in accordance with a predetermined protocol to the contents-reproduction apparatus 70, which has requested for the contents-data, through the transmission channel 60.

As the band information WB to be supplied to this read-processing circuit 522, traffic information can be used that can be obtained from a management information base (MIB) of a network appliance such as a router that constitutes the transmission-processing portion 53. Further, a measuring packet can be transmitted to the contents-reproduction apparatus 70 to identify a band by measuring a response time etc. from the contents-reproduction apparatus 70, thereby using a result of this identification as the band information WB.

Further, the amount of data BT may be varied in accordance with the bandwidth BA not only by performing frame rate adjustment at the read-processing circuit 522 based on the band information WB but by varying a data compression ratio at the encoder 524 based on the band information WB. In this case, the amount of data can be controlled further finely, so that it is possible to suppress deterioration in quality of images and sounds to be transmitted even if the bandwidth BA is decreased. Furthermore, the amount of data BT can be adjusted at the encoder 524 by making constant an adjusted frame rate irrespective of the band information WB during a frame period when the set frame rate FRs stays constant. In this case, it is possible to prevent a portion of contents having a desired frame rate set by the image pick-up apparatus 10 or the editing apparatus 30 from being adjusted to a different frame rate in accordance with the bandwidth BA.

Furthermore, if a recommended reproduction speed is set to the accessory information DMc, frame rate adjustment may be performed within a range in which reproduction is possible at the recommended reproduction speed, to adjust the amount of data BT at the encoder 524 if the number of frames needs to be made smaller than that at the time of reproduction at the recommended reproduction speed. In this case, contents can be reproduced at the recommended reproduction speed even if the bandwidth of the transmission channel 60 is decreased.

Incidentally, the contents-transmission processing performed by the above-mentioned contents-transmission apparatus 50 can be realized also by software processing by use of a computer. A configuration employed in the case of contents-transmission by means of software processing is shown in FIG. 9.

Figure 9:
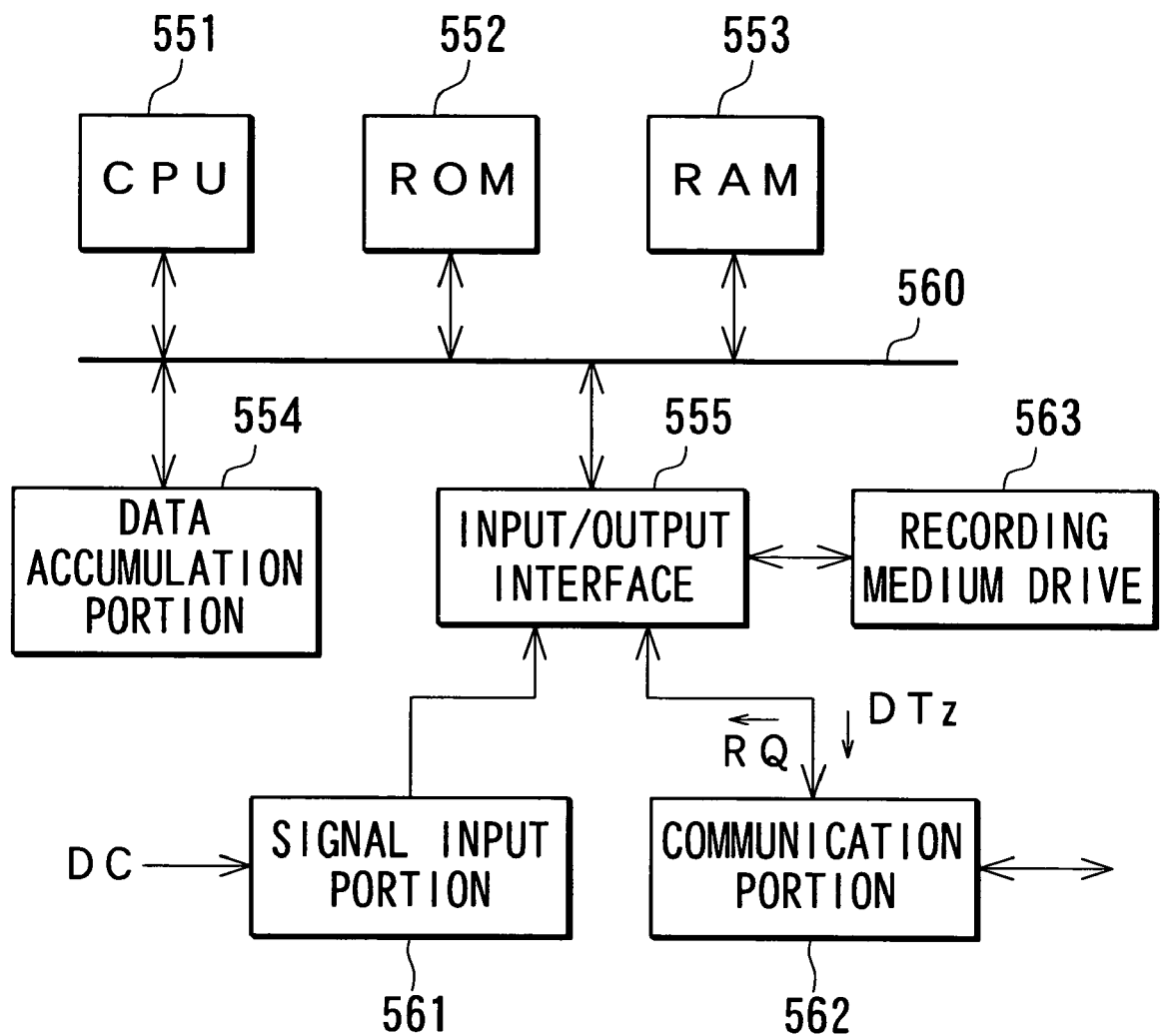
FIG. 9 is a diagram for showing a configuration in a case where contents are transmitted by software.

As shown in FIG. 9, the computer has a built-in CPU (Central Processing Unit) 551, and to CPU 551 via a bus 560 an ROM 552, an RAM 553, a data accumulation portion 554 constituted of a mass-capacity hard disk drive etc., and an input/output interface 555 are connected. Further, to the input/output interface 555, a signal input portion 561, a communication portion 562, and a recording medium drive 563 are connected.

The CPU 551 executes programs stored in the ROM 552, the RAM 553, or the data accumulation portion 554, thereby performing contents-transmission processing. Contents-data, which is input to the signal input portion 561, is stored in the data accumulation portion 554 via the input/output interface 555 and the bus 560. Further, when being supplied with the contents request signal RQ via the communication portion 562, the CPU 551 reads requested contents-data from among the contents-data stored in the data accumulation portion 554 and controls such the reading to adjust a frame rate so that the contents-data may have an amount of data that matches a capacity of the transmission channel 60. Furthermore, the CPU 551 generates transmit data DTz by performing encoding suitable for transmission. The transmit data DTz thus generated is output through the communication portion 562.

It is to be noted that a program used to transmit contents may be stored beforehand in the ROM 552 or the data accumulation portion 554 or the program used to transmit contents may be recorded in a recording medium by the recording medium drive 563 or the program recorded in the recording medium may be read and executed by it. Furthermore, the program may be transmitted or received by the communication portion 562 through a wireline or wireless transmission channel so that the received program can be executed by a computer.

Figure 10:
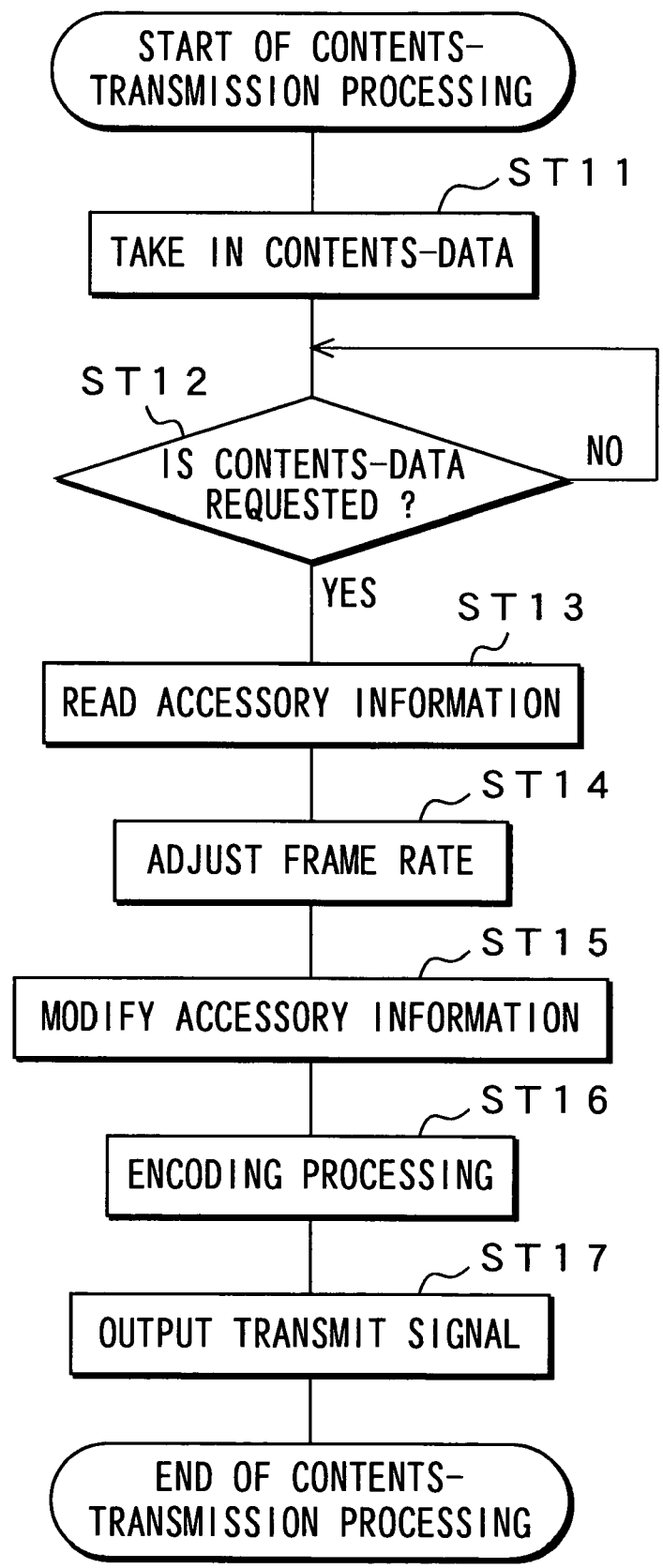
FIG. 10 is a flowchart for showing contents-transmission processing operation.

FIG. 10 is a flowchart for showing a contents-transmission processing operation. At step ST11, the CPU 551 takes in contents-data DC and stores the contents-data DC as input to the signal input portion 561 in the data accumulation portion 554. It is to be noted that the contents-data is not limited to that supplied from the editing apparatus 30; materials-data etc. generated by the image pick-up apparatus 10 may be stored as contents-data in the data accumulation portion 554.

At step ST12, the CPU 551 decides whether contents-data is requested. If no contents-data is requested, the process returns to step ST12 and, if contents-data is requested through, for example, the communication portion 562, the process goes to step ST13.

At step ST13, the CPU 551 reads accessory information of the requested contents-data and the process goes to step ST14.

At step ST14, the CPU 551 detects a band of the transmission channel and, in accordance with the detected band, controls the contents-data to be read from the data accumulation portion 554 utilizing the frame identification information, thereby adjusting the frame rate.

At step ST15, the CPU 551 modifies the accessory information DMza of the read contents-data DCza so that it may match the adjusted frame rate, thereby providing accessory information DMz. At step ST16, the CPU 551 performs encoding processing suited to the transmission channel using the contents-data DCz having the modified accessory information, thereby generating encoded data DZ. Furthermore, it generates transmit data DTz using the encoded data DZ thus generated and the accessory information DMz thus modified and the process goes to step ST17.

At step ST17, the PCU551 outputs the transmit data DTz thus generated from the communication portion 562 toward a destination of the requested contents-data.

Figure 11:
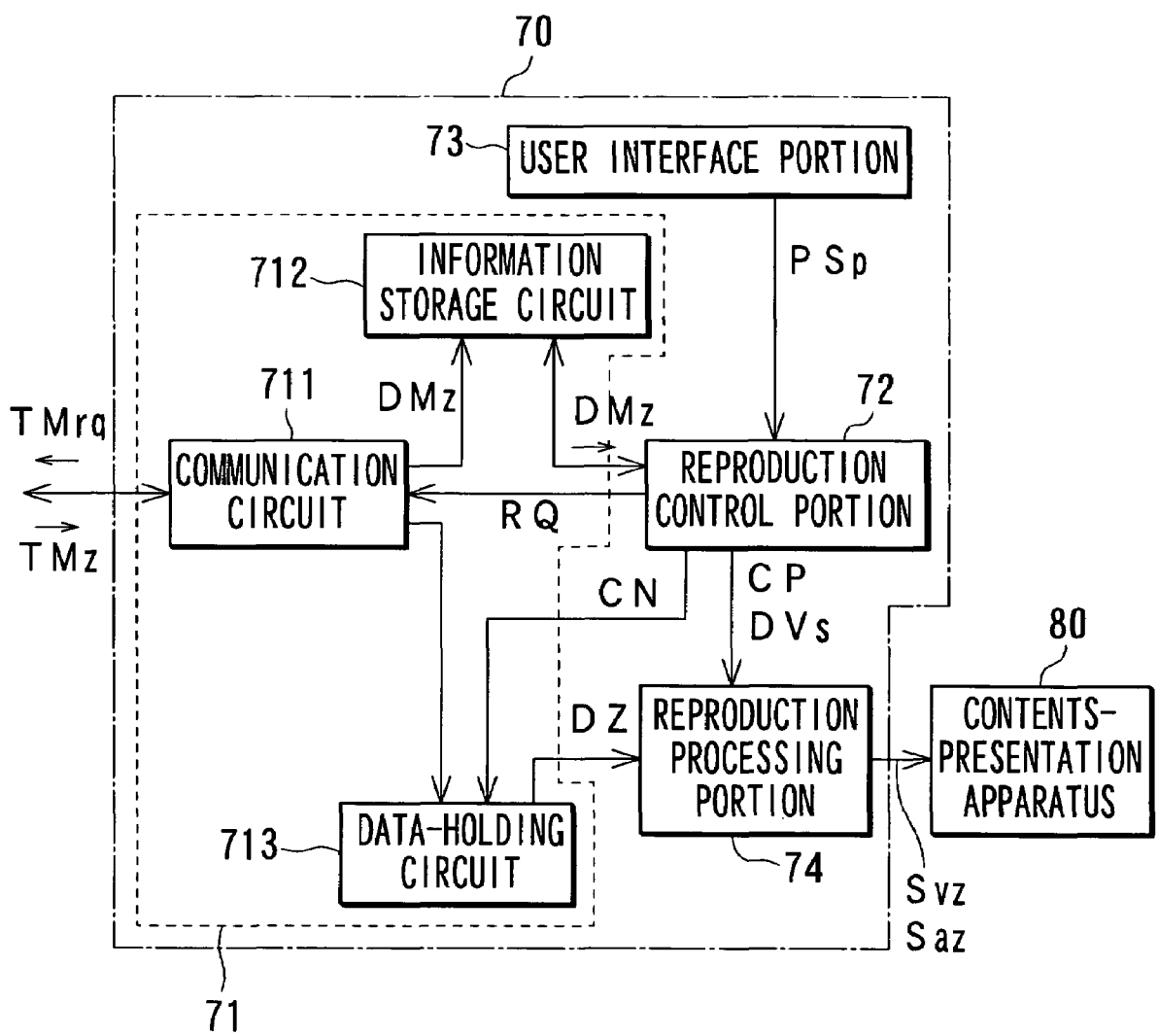
FIG. 11 is a diagram for showing a configuration of a contents-reproduction apparatus.

Next, the following will describe the contents-reproduction apparatus. FIG. 11 shows a configuration of the contents-reproduction apparatus 70. A transmit signal TMz supplied from the contents-transmission apparatus 50 is supplied to a communication circuit 711 in an input portion 71. The input portion 71 is adapted to take in contents-data, while the communication circuit 711 in the input portion 71 generates transmit data DTz from the transmit signal TMz thus supplied and extracts the encoded data DZ and the accessory information DMz from this transmit data DTz. Furthermore, the communication circuit 711 supplies the extracted accessory information DMz to an information storage circuit 712 and the encoded data DZ to a data-holding circuit 713. Further, the communication circuit 711 generates the transmit signal TMrq based on the contents request signal RQ from a later-described reproduction control portion 72 and supplies it to the contents-transmission apparatus 50.

The information storage circuit 712 stores the supplied accessory information DMz. The data-holding circuit 713 stores the encoded data DZ thus supplied.

To the reproduction control portion 72, a user interface portion 73 is connected. If an operation signal PSp from the user interface portion 73 requests for contents-data, the reproduction control portion 72 generates the contents request signal RQ based on the operation signal PSp and supplies it to the communication circuit 711, thereby requesting the contents-transmission apparatus 50 to transmit the contents-data.

Further, if the operation signal PSp instructs to reproduce contents-data, the reproduction control portion 72 supplies a read control signal CN to the data-holding circuit 713 to read from the data-holding circuit 713 the encoded data DZ of contents instructed to be reproduced and supplies it to a reproduction processing portion 74. Furthermore, the reproduction control portion 72 reads from the information storage circuit 712 the accessory information DMz that corresponds to the encoded data DZ thus read, generates image data DVs for displaying information contained in the accessory information DMz, for example, such image data as to indicate reproduction-enabling speed range based on restriction information contained in the accessory information DMz or if this accessory information DMz contains time information such as a time code, image data that indicates a total sum lapse of time, a moment of a reproduction position, etc. indicated by this time information, and supplies it to the reproduction processing portion 74. Accordingly, the reproduction-enabling speed range, the total sum lapse of time, the moment of the reproduction position, etc. are displayed on a screen of the contents-presentation apparatus 80 such as a TV set or a monitor apparatus. Further, if the accessory information DMz contains no speed range information, a reproduction-enabling speed range is set as described for the above-mentioned editing apparatus 30. The reproduction-enabling speed range thus set is displayed on the screen of the contents-presentation apparatus 80. If the operation signal PSp instructs to vary a contents-reproduction speed FP, the reproduction control portion 72 generates a presentation control signal CP for controlling operations of the reproduction processing portion 74 based on the accessory information DMz and supplies it to the reproduction processing portion 74.

Further, if a maximum reproduction-enabling speed of contents is indicated by the accessory information DMz, the reproduction control portion 72 sets a maximum speed in a variable range of the reproduction speed FP as the maximum speed indicated by the accessory information DMz. Furthermore, in a case where a recommended reproduction speed is indicated by the accessory information DMz, if no reproduction speed is indicated by the operation signal PSp, the reproduction control portion 72 generates the presentation control signal CP so that reproduction may be performed at this recommended reproduction speed. It is to be noted that if a title or a time length of contents is indicated by the accessory information DMz, the reproduction control portion 72 displays these pieces of information on the screen of the contents-presentation apparatus 80.

The reproduction processing portion 74 for reproducing contents at a variable speed decodes the encoded data DZ supplied from the data-holding circuit 713, to generate image data DVz and audio data DAz of the contents. The reproduction processing portion 74 further performs thinning-out or repeating processing by use of the frame identification information DMz-BN on the generated image data DVz and audio data DAz based on the presentation control signal CP, to generate an image signal Svz and an audio signal Saz in accordance with a reproduction speed FP that is set by the user or equal to the recommended reproduction speed and supplies them to the contents-presentation apparatus 80, thereby presenting the contents. Further, when being supplied with the image data DVs that indicates a variable range of the reproduction speed FP, the reproduction processing portion 74 generates the image signal Svz for displaying a variable range of this reproduction speed FP on the screen of the contents-presentation apparatus 80.

It is to be noted that if the encoded data DZ is composed of intra-frame encoded data, the reproduction processing portion 74 may, based on the presentation control signal CP from the data-holding circuit 713, read the encoded data DZ by thinning it out by a frame unit. In this case, it is unnecessary to decode the thinned out portion of the image data, thereby enabling decoding processing to be easily performed.

Further, the contents-reproduction apparatus 70 may use a recording medium in which contents-data is recorded. In this case, the data can be processed similarly by separating the accessory information DMz and the encoded data DZ from a reproduction signal generated by reproducing the recording medium, storing this accessory information DMz in the information storage circuit 712, and storing the encoded data DZ in the data-holding circuit 713.

Incidentally, the above-mentioned contents-reproduction processing by the contents-reproduction apparatus 70 can be realized by software processing executed by a computer. A configuration of contents-reproduction by means of this software processing is shown in FIG. 12.

Figure 12:
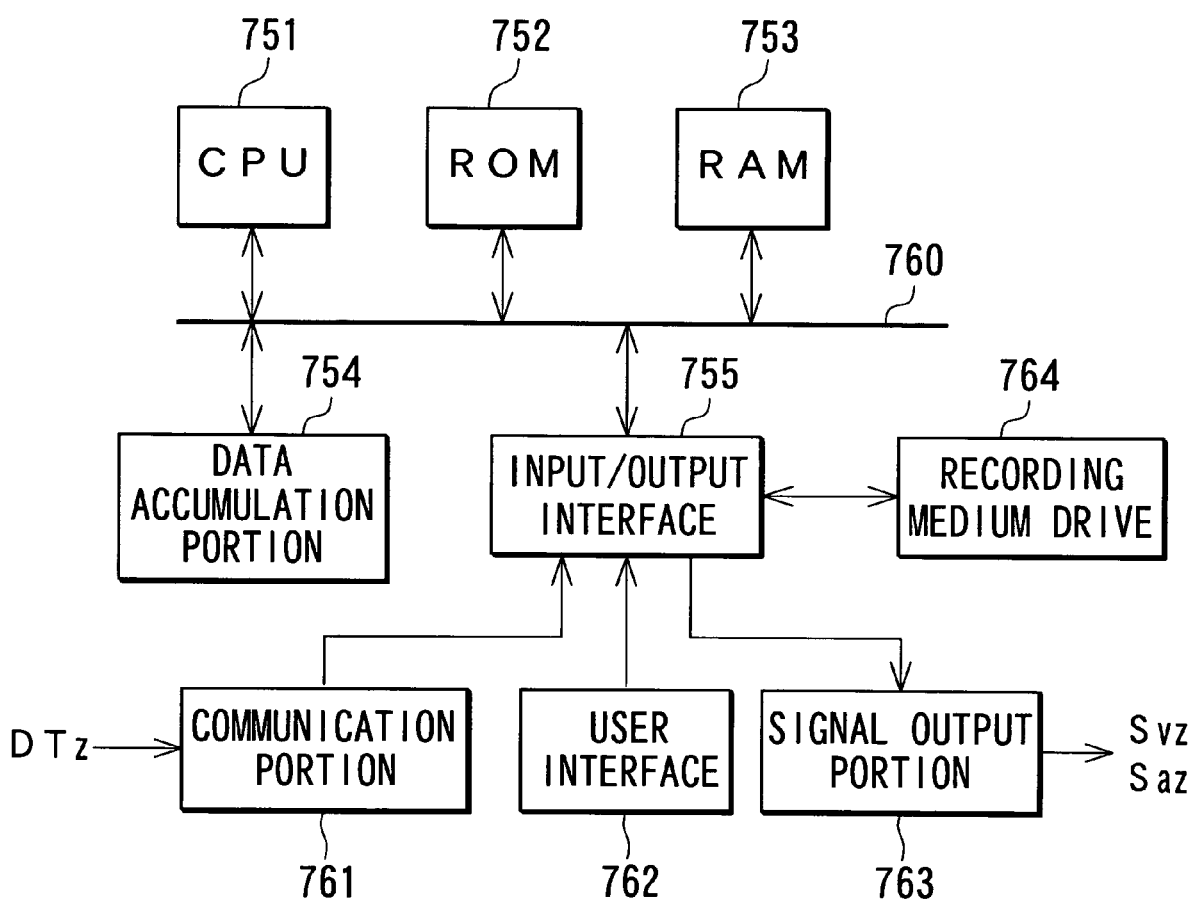
FIG. 12 is a diagram for showing a configuration in a case where contents are reproduced by software.

As shown in FIG. 12, the computer has a built-in CPU 751, to which an ROM 752, an RAM 753, a data accumulation portion 754, and an input/output interface 755 are connected via a bus 760. Furthermore, to the input/output interface 755, a communication portion 761, a user interface portion 762, a signal output portion 763, and a recording medium drive 764 are connected.

The CPU 751 executes programs stored in the ROM 752, the RAM 753 or the data accumulation portion 754, thereby performing contents-transmission processing based on the operation signal PSp from the user interface portion 762. In this case, if being supplied with transmit data DTz, the communication portion 761 extracts the encoded data DZ and the accessory information DMz. The encoded data DZ and the accessory information DMz thus extracted at this communication portion 761 are stored in the data accumulation portion 754. Further, the CPU 751 reads or decodes the encoded data DZ stored in the data accumulation portion 754 based on the operation signal PSp from the user interface portion 762, to generate image data DVz and audio data DAz and supply them to the signal output portion 763. The signal output portion 763 generates an image signal Svz and an audio signal Saz suitable for the contents-presentation apparatus 80 based on the image data DVz and the audio data DAz and outputs them.

It is to be noted that a program used for contents-reproduction processing may be stored beforehand in the ROM 752 or the data accumulation portion 754 or a program used for contents-reproduction processing may be recorded in a recording medium by the recording medium drive 764 or a program recorded in a recording medium may be read and executed thereby. Furthermore, the program may be transmitted or received by the communication portion 761 through a wireline or wireless transmission channel so that the received program can be executed by a computer.

Figure 13:
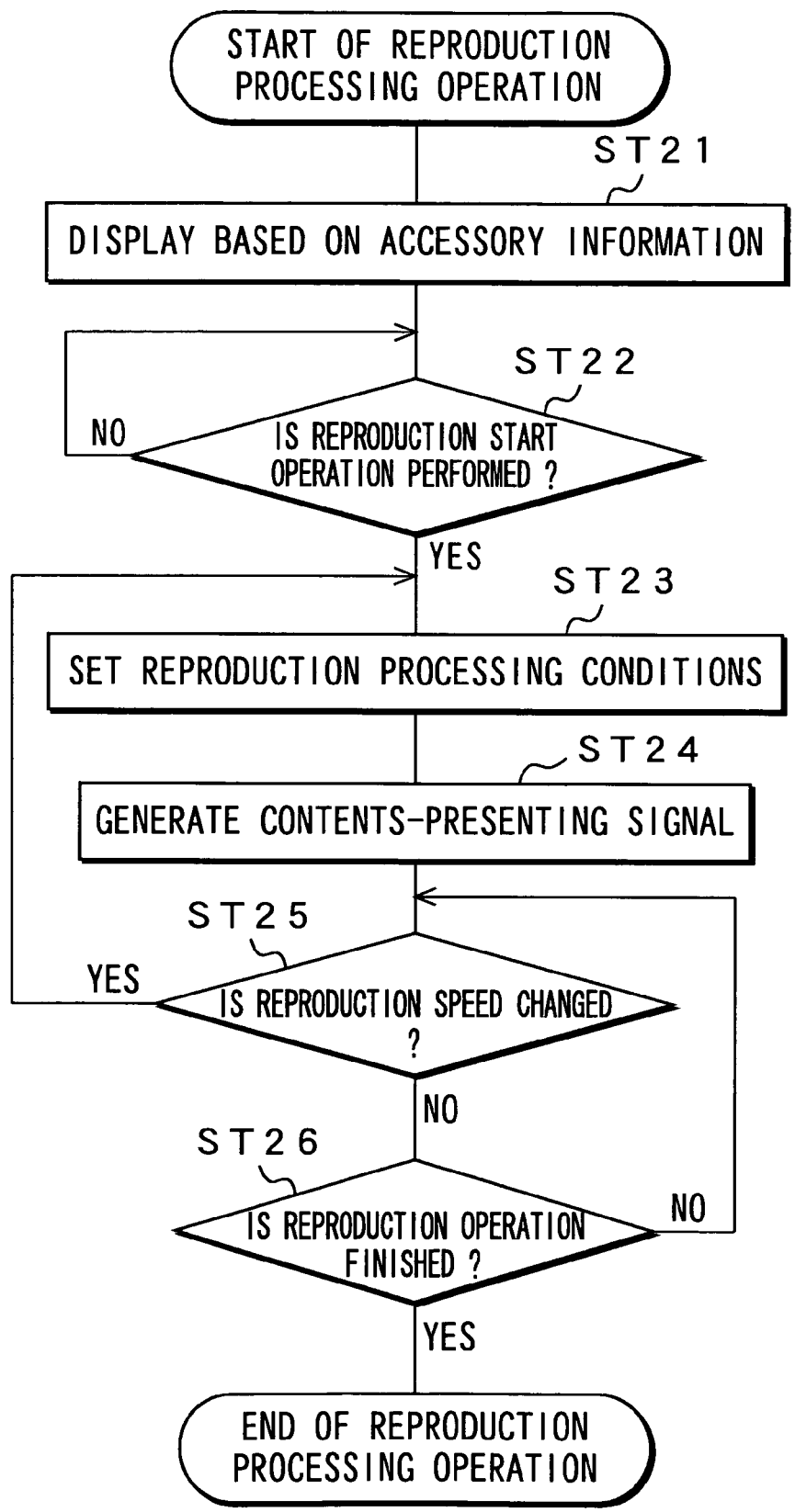
FIG. 13 is a flowchart for showing a contents-reproduction processing operation.

FIG. 13 is a flowchart for showing a contents-reproduction processing operation. When contents-data is reproduced, the CPU 751 performs input operations to allow an image required to constitute a GUI environment to be displaying on the contents-presentation apparatus 80 and the user interface portion 762 to perform operations in accordance with this displayed image.

Figure 14:
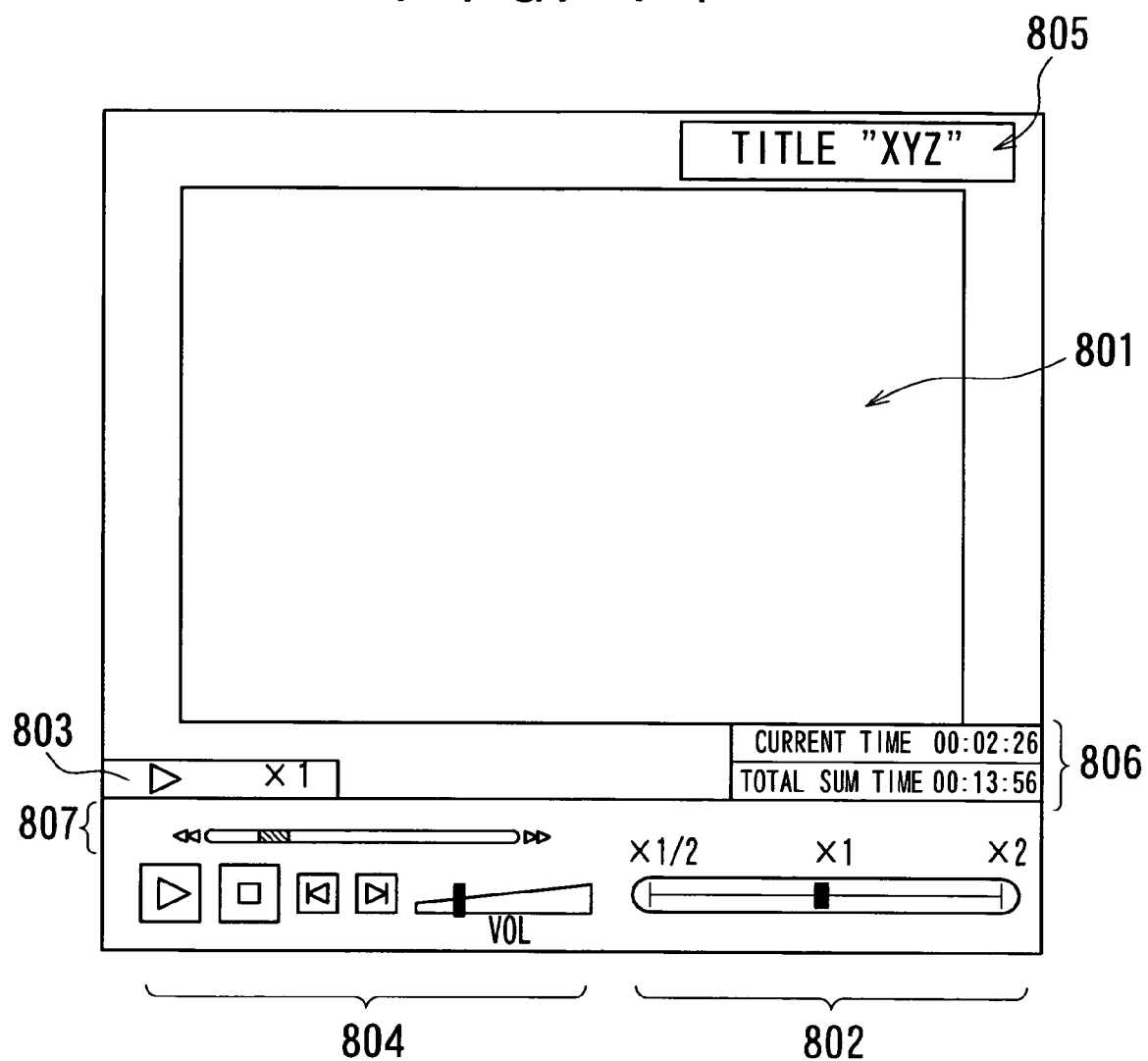
FIG. 14 is a diagram for showing an image displayed on a contents-presentation apparatus.

FIG. 14 shows an example of an image displayed on the contents-presentation apparatus 80, which displays images for GUI. On the screen of the contents-presentation apparatus 80, a viewer portion 801 for displaying an image on contents, a speed varying console portion 802 serving as an interface for varying the reproduction speed FP, a reproduction speed display portion 803 for displaying the reproduction speed FP, an operation control portion 804 for switching an operation mode, a sound volume, etc., a title display portion 805 for displaying a title of the contents, a time display portion 806 for displaying a reproduction time of the contents and a current time, a reproduction position display portion 807 for indicating a current reproduction position, etc. are provided.

At step ST21 of FIG. 13, the CPU 751 reads the accessory information DMz on contents from the data accumulation portion 754 and outputs the image signal Svz and the audio signal Saz generated on the basis of the accessory information DMz to the contents-presentation apparatus 80 from the signal output portion 763 via the input/output interface 755. Accordingly, display in accordance with the accessory information DMz is provided on the contents-presentation apparatus 80. For example, a title and a time length of the contents are displayed at the title display portion 805 and the time display portion 806, respectively. Further, based on speed range information, a minimum speed and a maximum speed are displayed at the speed varying console portion 802.

At step ST22, the CPU 751 identifies whether a reproduction start operation of the contents is performed on the basis of the operation signal PSp utilizing the operation control portion 804. If no reproduction start operation is performed, the CPU 751 is performed so that the process returns to step ST22 and, otherwise, goes to step ST23.

At step ST23, the CPU 751 sets reproduction processing conditions in accordance with a reproduction speed FP and a set frame rate FRs, that is, determines an interval for data thinning out and the number of data repeating which are performed when generating the image signal Svz and the audio signal Saz from the respective image data DVz and audio data DAz obtained by decoding the encoded data DZ.

At step ST24, the CPU 751 reads the encoded data DZ from the data accumulation portion 754 and decodes it to generate the image data DVz and the audio data DAz and, based on the reproduction processing conditions determined at step ST23, thins out or repeats the data by utilizing the frame identification information DMz-BN, thereby generating the image signal Svz and the audio signal Saz for presentation of contents. The CPU 751 supplies these generated image signal Svz and audio signal Saz to the contents-presentation apparatus 80, so that a reproduced image having a reproduction speed FP indicated by a cursor position (which is expressed in a heavy line) in the speed varying console portion 802 is displayed in the viewer portion 801 of the contents-presentation apparatus 80. Further, the reproduction speed FP used in this case is displayed in the reproduction speed display portion 803, while a reproduction time and a reproduction position are displayed in the time display portion 806 and the reproduction position display portion 807, respectively. Further, the contents-presentation apparatus 80 outputs a reproduced audio having a reproduction speed FP indicated at the cursor position in the speed varying console portion 802.

At step ST25, the CPU 751 identifies whether the reproduction speed FP is changed by moving the cursor position in the speed varying console portion 802. If the CPU 751 identifies that the reproduction speed FP is changed, the process returns to step ST23 and, if the CPU 751 identifies that no reproduction speed FP is changed, the process goes to step ST26.

At step ST26, the CPU 751 identifies whether the reproduction operation is finished. If the CPU 751 identifies that no operation is performed to stop reproduction or that the contents-reproduction position is not an end position, the process returns to step ST25. If the stop operation is performed or if the reproduction position is at the end position, the CPU 751 finishes the speed varying operation.

FIG. 15 is a flowchart for showing an operation of setting reproduction processing conditions to an image. At step ST31, the CPU 751 identifies the reproduction speed FP based on the cursor position in the speed varying console portion 802 and the process goes to step ST32. At step ST32, by multiplying the reference frame rate FRr by one and multiplying a cursor initialization position in the speed varying console portion 802 by one, the reproduction speed FP upon start of reproduction operation is set. Further, if a reproduction speed FP is recommended by the editing apparatus 30, the CPU 751 sets a position of this recommended reproduction speed Fp as the cursor initialization position and the recommended reproduction speed FP as the reproduction speed FP upon start of reproduction operation. Furthermore, if a cursor position is moved by the user, the CPU 751 sets a speed in accordance with the cursor position as the reproduction speed FP.

At step ST32, the CPU 751 identifies a set frame rate FRs based on frame rate information DMz-FRs contained in the accessory information DMz and the process goes to step ST33. At step ST33, the CPU 751 multiplies the reproduction speed FP and the set frame rate FRs by each other, thereby calculating an identification value FD for determining reproduction processing conditions.

At step ST34, the CPU 751 determines the reproduction processing conditions based on the identification value FD. In this case, if the identification value FD is not less than one and contains no fractions below decimal point, the CPU 751 determines the reproduction processing conditions so that images may be output after being thinned out at a frame interval in accordance with the identification value FD. If the identification value FD is not less than one and contains fractions below decimal point, the CPU 751 thins out images by utilizing the frame identification information DMz-BN at a frame interval in accordance with an integral portion of the identification value FD and, if images are obtained as many as a number of frames that matches a desired reproduction speed, determines the reproduction processing conditions so that positions of the images may be moved over to the next initial value of a sub-frame number BN. If the identification value FD is less than one, the CPU 751 determines the reproduction processing conditions so that the same image may be output repeatedly until the number of frames that matches a desired reproduction speed is reached. Based on the thus determined reproduction processing conditions, the processing at step ST24 is performed, to enable presenting an image on contents at a desired reproduction speed properly.

FIGS. 16A-16M show a reproduction operation in a case where the identification value FD is not less than one and contains no fractions below decimal point. FIG. 16A shows images based on such image data DVz that its set frame rate FRs may be 10 times the reference frame rate FRr. FIG. 16B shows frame rate information DMz-FRs that indicates a set frame rate FRs of a frame image, FIG. 16C shows frame identification information DMz-BN that indicates a sub-frame number BN of a frame image, and FIG. 16D shows an absolute frame number AN.

If, in this case, the reproduction speed FP is a multiplied-by-⅕ speed, the identification value FD becomes "10×(⅕)=2". Accordingly, as shown in FIGS. 16E-16G, at an interval of "FD=2" frames, that is, for every other frame, image data is used by utilizing the frame identification information DMZ-BN to generate an image signal Svz, thereby enabling a reproduced image at a multiplied-by-⅕ speed to be display on the contents-presentation apparatus 80. It is to be noted that FIG. 16E indicates frame identification information DMz-BN of an image to be displayed, FIG. 16F indicates an absolute frame number AN of an image to be displayed, and FIG. 16G shows a frame image to be displayed by the image signal Svz.

If the reproduction speed FP is a multiplied-by-1 speed, the identification value FP becomes "10×1=10". Accordingly, as shown in FIGS. 16H-16J, by generating the image signal Svz by using the image data DVz at an interval of "FD=10" frames, that is, as skipping nine frames of every 10 frames by utilizing frame identification information DMz-BN, a reproduced image having a multiplied-by-1 speed can be displayed on the contents-presentation apparatus 80. It is to be noted that FIG. 16H indicates frame identification information DMZ-BN of an image to be displayed, FIG. 16I indicates an absolute frame number AN of an image to be displayed, and FIG. 16J shows a frame image to be displayed by the image signal Svz.

Further, if the reproduction speed FP is a multiplied-by-2 speed, the identification value FD becomes "10×2=20". Accordingly, as shown in FIGS. 16K-16M, by generating the image signal Svz by using the image data DVz at an interval of "FD=20" frames, that is, as skipping 19 frames of every 20 frames by utilizing the frame identification information DMz-BN, a reproduced image having a multiplied-by-2 speed can be displayed on the contents-presentation apparatus 80. It is to be noted that FIG. 16K indicates frame identification information DMz-BN of an image to be displayed, FIG. 16L indicates an absolute frame number AN of an image to be displayed, and FIG. 16M shows a frame image to be displayed by the image signal Svz.

FIGS. 17A-17G show a reproduction operation in a case where the identification value FD is not less than one and contains no fractions below decimal point. FIG. 17A shows a frame image in a case where a set frame rate FRs is seven times the reference frame rate FRr. FIG. 17B shows frame rate information DMz-FRs that indicates a set frame rate FRs of a frame image, FIG. 17C shows frame identification information DMz-BN that indicates a sub-frame number BN of a frame image, and FIG. 17D indicates an absolute frame number AN.

If, in this case, the reproduction speed FP is a multiplied-by-⅓ speed, the identification value FD becomes "7×(⅓)=2.33 . . . ". Therefore, as shown in FIGS. 17E-17G, in accordance with an integral portion of the identification value FD, the image data DVz is used at an interval of two frames, that is, for every other frame by utilizing the frame identification information DMZ-BN. Furthermore, since the number of frames matches the desired reproduction speed, that is, the speed is multiplied by (⅓), if the image as many as three frames is output in one frame period having the reference frame rate FRr, the position of the image data DVz to be used over to the next initial value of the sub-frame number BN is moved. In this case, image signals Svz are sequentially generated using the pieces of image data DVz having sub-frame numbers BN of "0", "2", and "4", so that a reproduced image having a multiplied-by-⅓ speed can be displayed on the contents-presentation apparatus 80. It is to be noted that FIG. 17E indicates frame identification information DMz-BN of an image to be displayed, FIG. 17F indicates an absolute frame number AN of an image to be displayed, and FIG. 17G shows a frame image to be displayed by the image signal Svz.

FIGS. 18A-18M show a reproduction operation in a case where the identification value FD is less than one. FIG. 18A shows a frame image in a case where a set frame rate FRs is (¼) of the reference frame rate FRr. FIG. 18B shows frame rate information DMz-FRs that indicates a set frame rate FRs of a frame image, FIG. 18C shows frame identification information DMz-BN that indicates a sub-frame number BN of a frame image, and FIG. 18D indicates an absolute frame number AN.

If, in this case, the reproduction speed FP is a multiplied-by-1 speed, the identification value FD becomes "(¼)×1=¼". Therefore, as shown in FIGS. 18E-18G, by generating the image signal Svz by using the number of frames in accordance with the reproduction speed, that is, by repeatedly using the image data DVz four times for each frame, a reproduced image having a multiplied-by-1 speed can be displayed on the contents-presentation apparatus 80. It is to be noted that FIG. 18E shows frame identification information DMz-BN of an image to be displayed, FIG. 18F shows an absolute frame number AN of an image to be displayed, and FIG. 18G shows an image to be displayed by the image signal Svz.

If the reproduction speed FP is a multiplied-by-2 speed, the identification value FD becomes "(¼)×2=½". Therefore, as shown in FIGS. 18H-18J, by generating the image signal Svz by repeatedly using the image data DVz twice for each frame, a reproduced image having a multiplied-by-2 speed can be displayed on the contents-presentation apparatus 80. It is to be noted that FIG. 18H shows frame identification information DMz-BN of an image to be displayed, FIG. 18I shows an absolute frame number AN of an image to be displayed, and FIG. 18J shows a frame image to be displayed by the image signal Svz.

If the reproduction speed FP is a multiplied-by-4 speed, the identification value FD becomes "(¼)×4=1". Therefore, as shown in FIGS. 18K-18M, by generating the image signal Svz by sequentially using the image data DVz for each frame, a reproduced image having a mulitplied-by-4 speed can be displayed on the contents-presentation apparatus 80. It is to be noted that FIG. 18K shows frame identification information DMZ-BN of an image to be displayed, FIG. 18L shows an absolute frame number AN of an image to be displayed, and FIG. 18M shows a frame image to be displayed by the image signal Svz.

In such a manner, by reading image data at a reading interval based on a recording speed and a reproduction speed utilizing frame identification information, an image having a desired reproduction speed can be displayed easily.

The following will describe an audio. FIG. 19 is a flowchart for showing an operation of setting reproduction processing conditions to the audio. If audio data DAz is used for each frame, the sound does not continue between the frames, so that a discontinuity occurs in sound. Therefore, the sound is reproduced for each sample.

At step ST41, the CPU 751 decides a reproduction speed as in the case of step ST31 and the process goes to step ST42. At step ST42, the CPU 571 reads a set frame rate FRs as in the case of step ST32 and the process goes to step ST43. At step ST43, the CPU 751 calculates an identification value FD as in the case of step ST33 and the process goes to step ST44.

At step ST44, the CPU 751 determines the reproduction processing conditions based on the identification value FD. In this case, if the identification value FD is not less than one and contains no fractions below decimal point, it determines the reproduction processing conditions so that audio data may be thinned out at a sampling interval in accordance with the identification value FD. If the identification value FD is not less than one and contains fractions below decimal point, it determines the reproduction processing conditions so that the audio data may be thinned out at a sampling interval in accordance with an integral portion of the identification value FD from a multiple frames of the set frame rate FRs with respect to the reference frame rate FRr to thereby read the audio data as much as a reproduction speed. If the identification value FD is less than one, it determines the reproduction processing conditions so that the audio data may be used repeatedly until a number of sample frames that matches a desired reproduction speed is reached. Based on the thus determined reproduction processing conditions, the above-mentioned processing at step ST24 is performed, to enable a sound on the contents at a desired reproduction speed to be properly presented.

FIGS. 20A-20E show an audio reproduction operation in a case where the identification value FD is not less than one and contains no fractions below decimal point. FIG. 20A shows an absolute frame number AN, FIG. 20B shows frame rate information DMz-FRs that indicates a set frame rate FRs of a frame image, FIG. 20C shows frame identification information DMz-BN that indicates a sub-frame number BN of a frame image.

If, in this case, the reproduction speed FP is a multiplied-by-⅕ speed, the identification value FD becomes "10×(⅕)=2" because the set frame rate FRs is supposed to be 10 times the reference frame rate FRr. Accordingly, at an interval of "FD=2" samples, that is, for every other sample, the audio data DAz is used to generate an audio signal Saz, thereby enabling a reproduced sound having a multiplied-by-1 speed to be output from the contents-presentation apparatus 80. It is to be noted that FIG. 20D shows a frame which is used to generate the image signal Svz and FIG. 20E shows audio data which is used in the audio signal Saz if the audio data DAz has 14 samples/frame.

FIGS. 21A-21E show an audio reproduction operation in a case where the identification value FD is not less than one and contains fractions below decimal point. FIG. 21A shows an absolute frame number AN, FIG. 21B shows frame rate information DMz-FRs that indicates a set frame rate FRs of a frame image, and FIG. 21C shows frame identification information DMz-BN that indicates a sub-frame number BN of a frame image.

If, in this case, the reproduction speed FP is a multiplied-by-⅓ speed, the identification value FD becomes "7×(⅓)=2.3 . . . ." because the set frame rate FRs is supposed to be seven times the reference frame rate FRr. Further, if the audio data DAz has 14 samples/frame, the number of samples per frame at a multiplied-by-⅓ speed is "14×3/7=6". Accordingly, in accordance with an integral portion of the identification value FD, the audio data DAz is output at an interval of two samples, that is, for every other sample and, if the audio data DAz of six samples, which constitute one frame, is output, the audio data DAz skips to the beginning of the next frame and is output for every other sample. By thus selecting the audio data DAz and outputting it, a reproduced sound having a multiplied-by-⅓ speed can be obtained. Further, if filtering processing is performed in a case where a sound is output on the basis of the audio signal Saz, a good reproduced sound can be output by suppressing an influence due to thinning-out of the audio data DAz. Furthermore, samples are skipped fixedly in accordance with a set frame rate FRs and a reproduction speed FP to match the number of samples at the end of a frame, thereby enabling the audio signal Saz to be easily output in accordance with a reproduction speed. It is to be noted that FIG. 21C shows a frame which is used to generate the image signal Svz and FIG. 21D shows audio data which is used in the audio signal Saz when the audio data DAz has 14 samples/frame.

Further, in the case of generating the audio signal Saz by thinning out the audio data DAz, to prevent a reproduced sound to be discontinuous due to an increase in interval between items of the audio data DAz, the items of audio data which are used to generate the audio signal Saz may be thinned out so that they may have a roughly constant interval. For example, if a set frame rate FRs is KA times the reference frame rate FRr and a reproduction speed FP is a multiplied-by-1/KB speed, the audio data is taken out as many as KB number of samples at a roughly constant interval from the consecutive KB number of samples of the audio data DAz and, based on this taken out audio data, the audio signal Saz is generated. It is thus possible to output a reproduced sound having a further better sound quality, although the processing becomes complicated as compared to the case shown in FIGS. 21A-21E.

In a case where the identification value FD is less than one, although not shown, audio data is sequentially used repeatedly as many times as the number of repetitions of frames of an image, thereby enabling the audio data DAz having a desired reproduction speed to be generated.

In such a manner, a contents-transmission side transmits contents-data DCz in which the accessory information DMz including frame rate information and frame identification information for identifying frames included in a reference frame period is linked to main data indicating an image and/or a sound. Further, a contents-reproduction side reproduces the image and/or the sound by varying a reproduction speed utilizing the accessory information DMz that contains the frame rate information and the frame identification information. Accordingly, the user not only can view an image etc. having a predetermined reproduction speed as in the case of a broadcast program but also can view the image etc. at his desired reproduction speed. For example, by generating contents such as a relayed sports program at a set frame rate FRs higher than the reference frame rate FRr, the user need not wait until a slow-speed reproduction image is supplied from a contents-provider as in the case of a conventional broadcast program but can view only a desired scene at a slow reproduction speed while viewing the image at a multiplied-by-1 speed usually.

Further, on the contents-transmission side, a frame rate is adjusted in accordance with a band of a transmission channel by utilizing the frame identification information, thereby enabling frame rate adjustment to be easily executed. Further, on the contents-reproduction side, data can be, for example, thinned out for each frame easily by utilizing the frame identification information, thereby varying the contents-reproduction speed easily.

INDUSTRIAL APPLICABILITY

As described above, the present invention is useful in the case of transmitting image contents etc. and reproducing them and well suited particularly to a case where a frame rate at the time of reproduction is varied.

The invention claimed is:

1. A transmission apparatus comprising:
transmit data generation means for generating transmit data by linking to main data representing an image and/or audio accessory information including information on a frame rate of this main data and frame identification information of each frame included in a reference frame period such that in the event that a plurality of frames are included within the reference frame period, then the frame identification information indicates the identification of each of the plurality of frames and the order of the plurality of frames within said reference frame period; and
transmission processing means for performing output processing on the transmit data via a transmission channel,
wherein the transmit data generation means includes:
accumulation means for accumulating the main data temporarily; and
read processing means for controlling read processing of the main data accumulated in the accumulation means.

2. The transmission apparatus according to claim 1, further comprising information modification means for modifying frame rate information contained in the accessory information, in response to adjustment of the frame rate by the read processing means.

3. The transmission apparatus according to claim 1, wherein the accessory information includes information indicating a recommended reproduction speed of the main data.

4. The transmission apparatus according to claim 1, wherein the accessory information includes information indicating a reproduction-enabling maximum speed of the main data.

5. The transmission apparatus according to claim 1,
wherein the transmission processing means informs the transmit data generation means of a band of the transmission channel, and
wherein the read processing means controls reading of the main data in accordance with the informed band utilizing the frame identification information, thereby adjusting the frame rate of the main data.

6. The transmission apparatus according to claim 5, further comprising information modification means for modifying the frame rate information and the frame identification information which are contained in the accessory information, in response to adjustment of the frame rate by the read processing means.

7. A transmission method comprising:
a transmit data generation step for generating transmit data by linking to main data representing an image and/or audio accessory information including information on a frame rate of this main data and frame identification information of each frame included in a reference frame period such that in the event that a plurality of frames are included within the reference frame period, then the frame identification information indicates the identification of each of the plurality of frames and the order of the plurality of frames within said reference frame period; and
a transmission processing step for performing output processing on the transmit data via a transmission channel.

8. The transmission method according to claim 7, further comprising an information modification step for modifying the frame rate information contained in the accessory information, in response to adjustment of the frame rate by the read processing step.

9. The transmission method according to claim 7, wherein the accessory information includes information indicating a recommended reproduction speed of the main data.

10. The transmission method according to claim 7, wherein the accessory information includes information indicating a reproduction-enabling maximum speed of the main data.

11. The transmission method according to claim 7,
wherein the transmit data generation step includes a read processing step for controlling read processing of the main data temporarily accumulated in accumulation means; and
wherein in the read processing step, reading of the main data is controlled in accordance with a band of the transmission channel utilizing the frame identification information, thereby adjusting the frame rate of the main data.

12. The transmission method according to claim 11, further comprising an information modification step for modifying the frame rate information and the frame identification information which are contained in the accessory information, in response to adjustment of the frame rate in the read processing step.

13. A program stored on a computer readable medium, the program when executed by a computer causing the computer to perform a transmission method, the method comprising:
a transmit data generation step for generating transmit data by linking to main data representing an image and/or audio accessory information including information on a frame rate of this main data and frame identification information of each frame included in a reference frame period such that in the event that a plurality of frames are included within the reference frame period, then the frame identification information indicates the identification of each of the plurality of frames and the order of the plurality of frames within said reference frame period; and
a transmission processing step for performing output processing on the transmit data via a transmission channel.

14. A computer readable medium accessible during execution of a computer, the computer readable medium being for recording data that comprises main data representing an image and/or audio, and accessory information linked to the main data, the accessory information including information of a frame rate of this main data and frame identification information of each frame included in a reference frame period such that in the event that a plurality of frames are included within the reference frame period, then the frame identification information indicates the identification of each of the plurality of frames and the order of the plurality of frames within said reference frame period.

\* \* \* \* \*